(12) United States Patent
Goh et al.

(10) Patent No.: US 12,542,409 B2
(45) Date of Patent: Feb. 3, 2026

(54) SUSTAINABLE SYSTEM AND METHOD OF USER REPAIR AND UPGRADE FOR LAPTOP HARDWARE COMPONENTS

(71) Applicant: Dell Products, LP, Round Rock, TX (US)

(72) Inventors: Peng Lip Goh, Singapore (SG); Weijong Sheu, Austin, TX (US); Deeder M. Aurongzeb, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 298 days.

(21) Appl. No.: 18/379,995

(22) Filed: Oct. 13, 2023

(65) Prior Publication Data
US 2025/0125570 A1 Apr. 17, 2025

(51) Int. Cl.
| | | |
|---|---|---|
| *H01R 31/06* | (2006.01) | |
| *G06F 1/16* | (2006.01) | |
| *H01R 12/70* | (2011.01) | |
| *H01R 13/627* | (2006.01) | |
| *H01R 43/26* | (2006.01) | |
| *H05K 5/00* | (2025.01) | |

(52) U.S. Cl.
CPC .......... *H01R 31/06* (2013.01); *G06F 1/1664* (2013.01); *G06F 1/169* (2013.01); *H01R 12/7082* (2013.01); *H01R 13/6275* (2013.01); *H01R 43/26* (2013.01); *H05K 5/0073* (2013.01); *H01R 2201/06* (2013.01)

(58) Field of Classification Search
CPC ............... H01R 31/06; H01R 12/7082; H01R 13/6275; H01R 43/26; H01R 2201/06; G06F 1/1664; G06F 1/169; H05K 5/0073
USPC .......................................................... 439/74
See application file for complete search history.

(56) References Cited

U.S. PATENT DOCUMENTS

| | | | | |
|---|---|---|---|---|
| 5,738,536 A | * | 4/1998 | Ohgami ............... | G06F 1/1683 361/679.55 |
| 7,202,631 B2 | | 4/2007 | Breen | |
| 7,583,495 B2 | * | 9/2009 | Carnevali ............ | G06F 1/1632 361/679.41 |
| 7,641,483 B2 | * | 1/2010 | Wei ........................ | H01R 24/58 439/131 |

(Continued)

*Primary Examiner* — Gary F Paumen
(74) *Attorney, Agent, or Firm* — Prol Intellectual Property Law, PLLC; H. Kenneth Prol

(57) ABSTRACT

A base chassis assembly for an information handling system for replacement of power and input/output (IO) connectors or a battery may comprise a base chassis top cover joined to a base chassis bottom cover and including a replaceable IO and power pin/port connector module and a removable palm rest and touchpad assembly enclosing a battery disposed within base chassis assembly. A connector module circuit board operably connected to power and IO connectors in the replaceable IO and power pin/port connector module slidable to slide the power and IO connectors into sidewall apertures of the base assembly upon installation of the replaceable IO and power pin/port connector module in the base chassis assembly and the removable palm rest and touchpad assembly removable with removal of at least one fastener to access and service the battery providing for simple servicing or replacement of parts for the information handling system.

20 Claims, 16 Drawing Sheets

(56) References Cited

U.S. PATENT DOCUMENTS

| | | | |
|---|---|---|---|
| 7,889,490 B2 * | 2/2011 | Chen | H05K 7/1457 360/245.1 |
| 7,928,696 B2 | 4/2011 | Odaohhara | |
| 8,307,222 B2 | 11/2012 | Wang | |
| 9,207,728 B2 | 12/2015 | Degner | |
| 2011/0090633 A1 | 4/2011 | Rabinovitz | |
| 2015/0349446 A1 * | 12/2015 | Zantout | H01R 12/732 439/74 |
| 2023/0110275 A1 | 4/2023 | Litichever | |

* cited by examiner

PERSPECTIVE VIEW

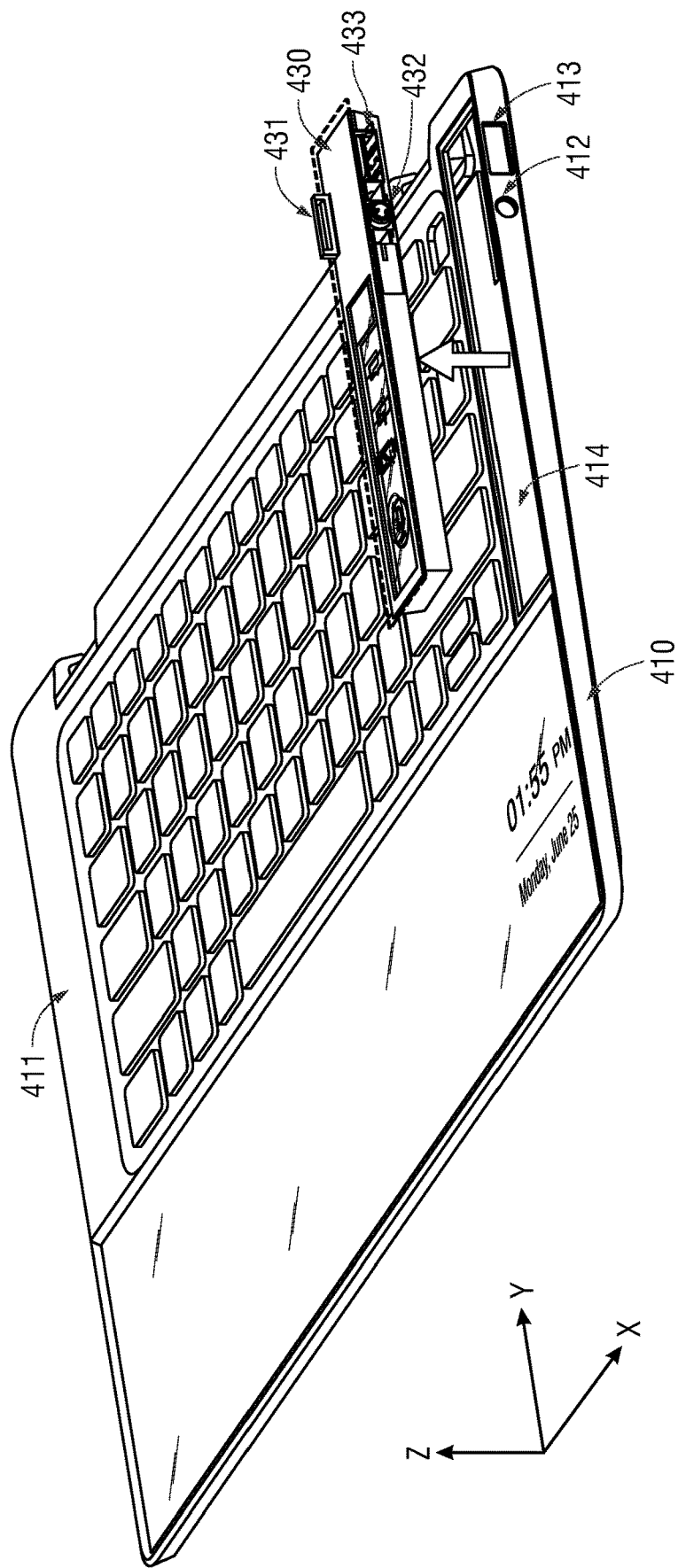

PERSPECTIVE VIEW

CROSS-SECTIONAL VIEW

PERSPECTIVE VIEW

SUSTAINABLE SYSTEM AND METHOD OF USER REPAIR AND UPGRADE FOR LAPTOP HARDWARE COMPONENTS

FIELD OF THE DISCLOSURE

The present disclosure generally relates to assembly of a base chassis for an information handling system incorporating a removable palm rest and touchpad assembly and a replaceable IO and power pin/port connector module. More specifically, the present disclosure relates to the use of a modular housing for IO and power pin/port connectors that may be removed and replaced by a user without replacing a laptop motherboard, and a palm rest and touchpad assembly that may be removed or moved to access and replace laptop batteries without separating a base chassis upper cover and lower cover, which may cause cracking or destruction of various chassis or hardware components.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include one or more connectors for input devices incorporated within a base chassis that may also include a keyboard and touchpad, for example.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 4A is a graphical diagram illustrating a perspective view of a mobile information handling system base chassis including an opening for insertion and removal of a replaceable IO and power pin/port connector module according to an embodiment of the present disclosure;

DETAILED DESCRIPTION OF THE DRAWINGS

Figure 1:
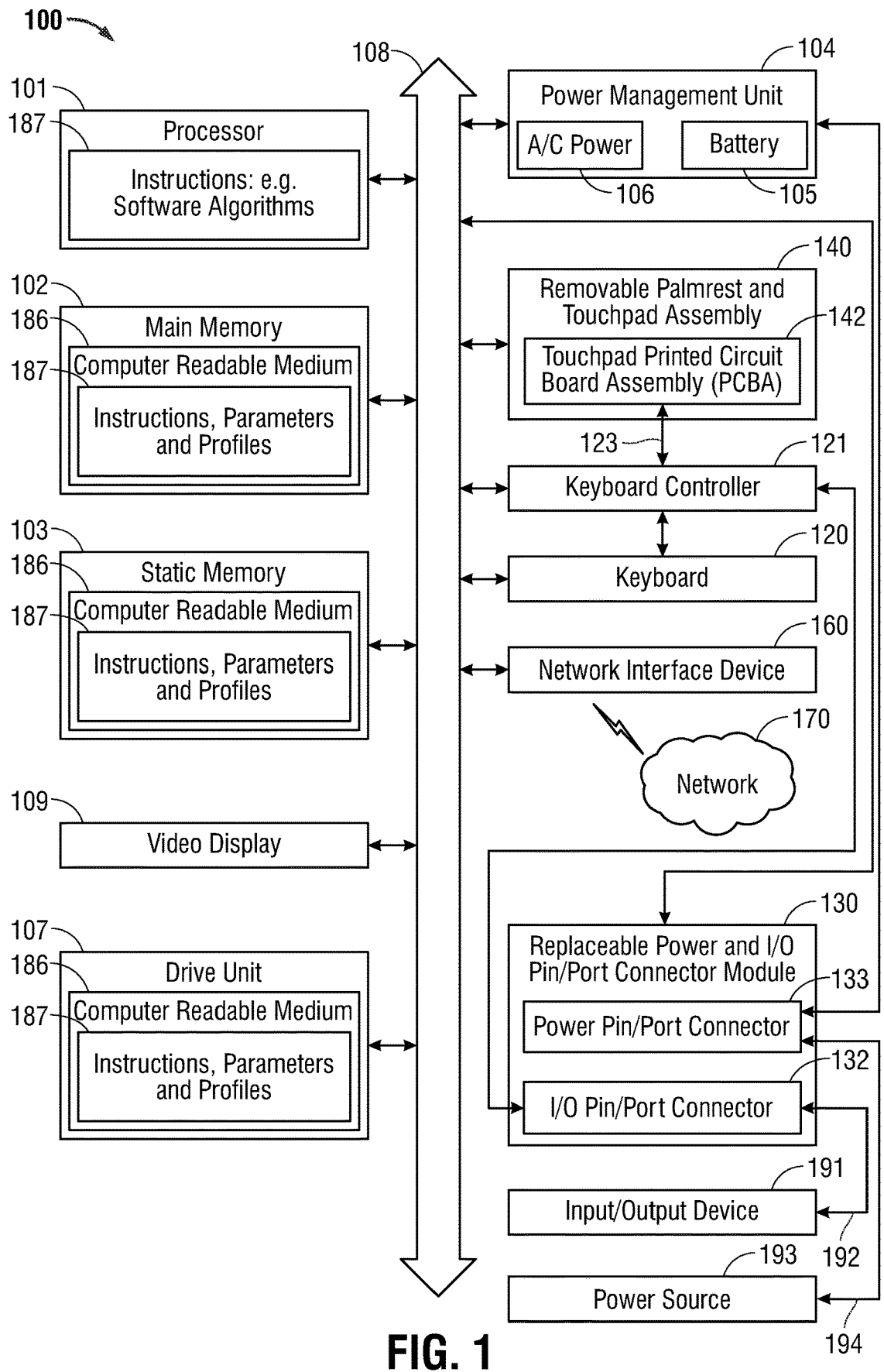
FIG. 1 is a block diagram illustrating a mobile information handling system operably coupled to a removable touchpad and palm rest assembly and a replaceable input/output (IO) and power pin/port connector module according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems, such as notebook, tablet, and laptop computers may include a display chassis housing the video display screen, and a base chassis housing a keyboard, touchpad, and various internal components necessary for operation of the information handling system, such as processors, memory, buses, and network interface devices, for example. The base chassis for such information handling systems may include a top cover where the keyboard and touchpad may be situated and accessible by the user, and a bottom portion that mates with the top cover to enclose the various operational components (e.g., processor, memory, etc.). For example, such a base chassis may enclose or at least partially house one or more power connectors for connecting to direct current (DC) power adapters, and one or more input/output (IO) connectors for connecting to various types of IO devices (e.g., mouse, printer, display, headphones, Universal Serial Bus (USB) peripheral devices, external hard drives, cameras, other mobile devices such as smart phones, etc. Such base chasses may also house rechargeable batteries operating to supply power to various hardware components of the information handling system.

In existing systems, in order to replace failed batteries or failed power or IO connectors, a user must separate the top cover of the base chassis from the bottom cover of the base chassis. This may be the only way to access these failed components. These components may be prone to failing but not exceedingly expensive to replace. However, replacement may be difficult or damage the information handling system. Further, in existing systems, power or IO connectors may be permanently or non-removably fixed (e.g., via soldering) to a motherboard housing a processor and various other critical hardware components for the information handling system. As such, in order to replace these power or IO connectors in existing systems, the motherboard for the information handling system may also have to be replaced. A system is needed that allows a user simpler access to replace batteries, power connectors, and IO connectors without separating the top cover of the base chassis from the bottom cover, which may damage the chassis and various internal components, the power or IO connectors or the motherboard of the information handling system.

The replaceable IO and power pin/port connector module and removable palm rest and touchpad assembly of embodiments of the present disclosure address this issue by allowing the user to lift the removable palm rest and touchpad assembly to access and replace batteries and to remove and replace the replaceable IO and power pin/port connector module without separating the base chassis top cover from the base chassis bottom cover. For example, embodiments of the present disclosure describe a base chassis incorporating a removable palm rest and touchpad assembly having one side that can be unscrewed from the base chassis bottom cover and hinged and lifted upward to allow for insertion of replacement batteries without separating the base chassis bottom cover from the base chassis top cover.

The replaceable IO and power pin/port connector module in embodiments of the present disclosure may house one or more replaceable module power or IO pin/port connectors operably connected to a connector module circuit board and a module-side motherboard connector. Upon insertion of such a replaceable IO and power pin/port connector module, the module-side motherboard connector in embodiments may mate with a motherboard-sided module connector operably connected to the motherboard (e.g., including the processor) of the information handling system. Thus, the replaceable IO and power pin/port connector module may mate with a motherboard of the information handling system and be decoupled from the motherboard of the information handling system (e.g., for replacement) including the power or IO connectors without replacing the motherboard of the information handling system.

The design of the replaceable IO and power pin/port connector module in embodiments may also allow for removable, replacement, and insertion of the replaceable IO and power pin/port connector module within the base chassis of the information handling system without separating the base chassis bottom cover from the base chassis top cover. For example, the replaceable IO and power pin/port connector module may incorporate a sliding circuit board tray that allows for movement of the connector module circuit board and the operably connected replaceable module power and IO pin/port connectors. This may cause the replaceable module power and IO pin/port connectors to slide partially into openings for these connectors within the base chassis bottom cover when the replaceable IO and power pin/port connector module is in a locked position. This may also allow for the replaceable module power and IO pin/port connectors to slide away from these openings and into the interior of the module to ease user removal of the module from the base chassis upon replacement. A series of springs and locks within the replaceable IO and power pin/port connector module in embodiments may further operate to lock the module into place within the base chassis in response to user application of downward force on an exterior push/pull tab and to unlock the module from the base chassis upon user upward force on the exterior push/pull tab.

FIG. 1 illustrates an information handling system 100 according to several aspects of the present disclosure. In various embodiments described herein, a replaceable power and IO pin/port connector module 130 housing power pin/port connector 133 or an IO pin/port connector 132 may be operably connected to the information handling system 100 such that the replaceable power and IO pin/port connector module 130 may be removable and replaceable with respect to the information handling system 100. This may allow for replacement of power pin/port connector 133 or IO pin/port connector 132 without separating a base chassis upper and lower cover housing various internal components (e.g., 101, 102, 103, 104, 108, 120, 140, 160) of the information handling system and without replacing a motherboard incorporating, at least, the hardware processor 101. Further, a removable palm rest and touchpad assembly 140 may be operably connected to the information handling system 100 and movably fixed to the base chassis bottom cover via magnets or removable fasteners to provide easy access for removal and replacement of battery 105 without separating the base chassis upper and lower cover.

In a networked deployment, the information handling system 100 may operate in the capacity of a server or as a client computer in a server-client network environment, or as a peer computer system in a peer-to-peer (or distributed)

network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports (e.g., 132 and 133) for communicating with various input and output (I/O) devices 191, a keyboard 120, a touchpad within the removable palm rest and touchpad assembly 140, or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions, the wireless network interface device 160, a static memory 103 or drive unit 107, a, a video display 109, or other components of an information handling system. More specifically, battery 105 or alternating current (A/C) power adapter 106 may be operably connected to the motherboard for the information handling system 100 to provide power to components in the information handling system 100 including the motherboard. The power management unit 104 is operably coupled to the processor 101 via bus 108. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

One or more IO devices 191 in an embodiment may be operably connected to the IO pin/port connector 132 of the replaceable power and IO pin/port connector module 130 via a connector cable 192 adhering to any number of IO connector cable formats. For example, the IO pin/port connector 132 and the cable 192 may adhere to any of the known or later-developed standards for the universal serial bus (USB), including USB 2.0, USB 3.X, USB-A, USB-B, USB-C, USB-mini, and USB-micro. In other example embodiments, the IO pin/port connector 132 and the cable 192 may adhere to other standards such as High Definition Multimedia Interface (HDMI®), Serial Advanced Technology Attachment (SATA), external-SATA (e-SATA), Firewire®, Thunderbolt®, DisplayPort®, Mini-DisplayPort®, audio, Video Graphics Array (VGA), Digital Visual Interface (DVI), Mini-DVI, DVI-I, DVI-D, digital audio, co-axial cable, Ethernet®, modem, personal system/2 (ps/2), or any known or later-developed IO interface standards.

The replaceable power pin/port connector 133 of the replaceable power and IO pin/port connector module 130 in an embodiment may be operably connected to one or more power sources 193 via a power cord 194. Such a power cord 194 in an embodiment may provide direct current (D/C) power to the information handling system 100 via the replaceable power pin/port connector 133. The replaceable power pin/port connector 133 may have a pin configuration or port housing that adheres to any known or later developed configuration for supplying D/C power via an A/C adapter from an A/C power source, including barrel housings, rectangular or square housings, and various thicknesses (e.g., 5.5 mm or 2.1 mm).

The information handling system 100 may further include a removable palm rest and touchpad assembly 140 mounted within a base chassis of the information handling system 100, which may further incorporate a touchpad printed circuit board assembly (PCBA) 142 and a keyboard controller 121. In some embodiments, the touchpad PCBA 142 may also communicate with the keyboard 120 via a USB or other link 123. The keyboard 120 and keyboard controller 121 in an embodiment may also communicate with or be operably connected to the touchpad PCBA 142 or the processor 101 of the motherboard for the information handling system 100 via bus 108. The removable palm rest and touchpad assembly 140 may be housed within a removable palm rest and touchpad assembly (e.g., as described in greater detail with respect to FIG. 2, below) that may be removed and may be operably connected via bus 108 to a motherboard housing the processor 101 of the information handling system 100 in an embodiment. The removable palm rest and touchpad assembly 140 in an embodiment may be removed from the base chassis bottom cover in which various components of the information handling system 100 are housed in order to access, remove, or replace the batteries 105 housed within the base chassis bottom cover under the removable palm rest and touchpad assembly 140, without separating the base chassis bottom cover from the base chassis top cover.

The information handling system 100 may execute code instructions 187, via one or more hardware processing resources, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 191, the touchpad of the removable palm rest and touchpad assembly 140, the keyboard 120, or the like.

The network interface device 160 may provide connectivity of the information handling system 100 to the network 170 via a network access point (AP) in an embodiment. The network 170 in some embodiments may be a wired local area network (LAN), a wireless personal area network (WPAN), a public Wi-Fi communication network, a private Wi-Fi communication network, a public WiMAX communication network, or other non-cellular communication networks. In other embodiments, the network 170 may be a wired wide area network (WAN), a 4G LTE public network, or a 5G communication network, or other cellular communication networks. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, WiMAX, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax/be including Wi-Fi 6, Wi-Fi 6e, and the emerging Wi-Fi 7 standard. It is understood that any number of available channels may be available in WLAN under the 2.4 GHZ, 5 GHZ, or 6 GHz bands which may be shared communication frequency bands with WWAN protocols or Bluetooth® protocols in some embodiments.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 may be stored in static memory 103, or the drive unit 107 on a computer-readable medium 186 such as a flash memory or magnetic disk in an example embodiment.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® brand hardware processor, ARM® brand hardware processors, Qualcomm® brand hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 100 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
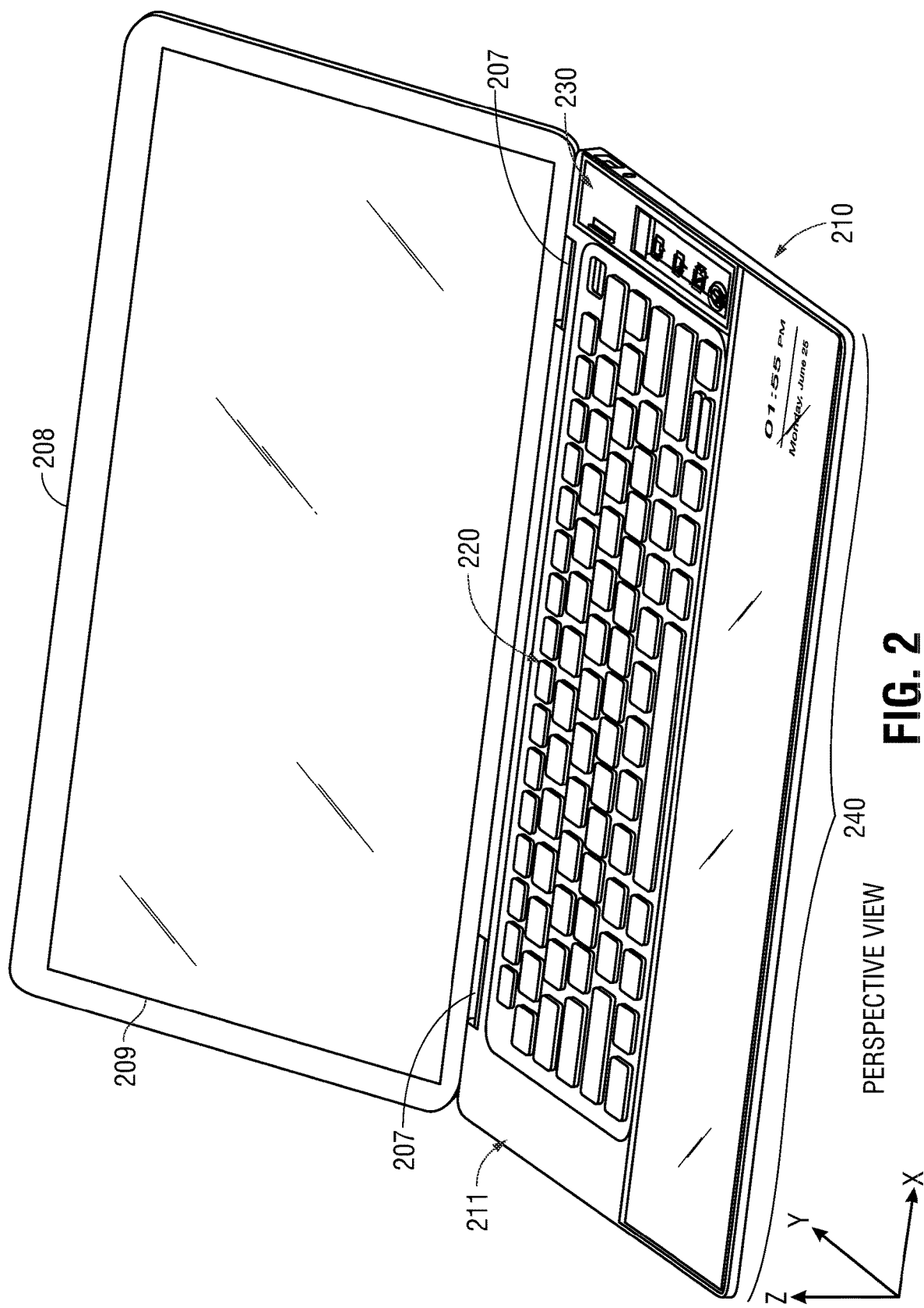
FIG. 2 is a graphical diagram illustrating perspective view of a base chassis including a removable palm rest and touchpad assembly and a replaceable IO and power pin/port connector module according to an embodiment of the present disclosure.

FIG. 2 is a graphical diagram illustrating a perspective view of a base chassis for a mobile information handling system incorporating a removable palm rest and touchpad assembly and a replaceable IO and power pin/port connector module according to an embodiment of the present disclosure. A base chassis top cover 211 may be formed in an embodiment with openings for a keyboard 220, a removable palm rest and touchpad assembly 240, and a replaceable IO and power pin/port connector module 230. In an embodiment, the replaceable IO and power pin/port connector module 230 may be removable and replaceable without separating the base chassis top cover 211 from the base chassis bottom cover 210. Because such a replaceable IO and power pin/port connector module 230 in an embodiment may also house a power or IO pin/port connector, such power or IO pin/port connectors may similarly be removed and replaced without separating the base chassis top cover 211 from the base chassis bottom cover 210 and without replacing the motherboard for the mobile information handling system.

A removable palm rest and touchpad assembly 240 may be operably connected to a motherboard including the processor of the information handling system in an embodiment (e.g., as described in greater detail with respect to FIG. 1). The removable palm rest and touchpad assembly 240 may be fastened to the base chassis such that it may easily be unfastened and lifted to access a battery located below in the base chassis, as described in greater detail below with respect to FIG. 3. The base chassis top cover 211 may be joined to a base chassis bottom cover 210 in an embodiment, to form a mobile information handling system base chassis. In an embodiment, such a base chassis may also be operably connected via a hinge 207 to a mobile information handling system display chassis 208 housing a digital display 209.

Figure 3:
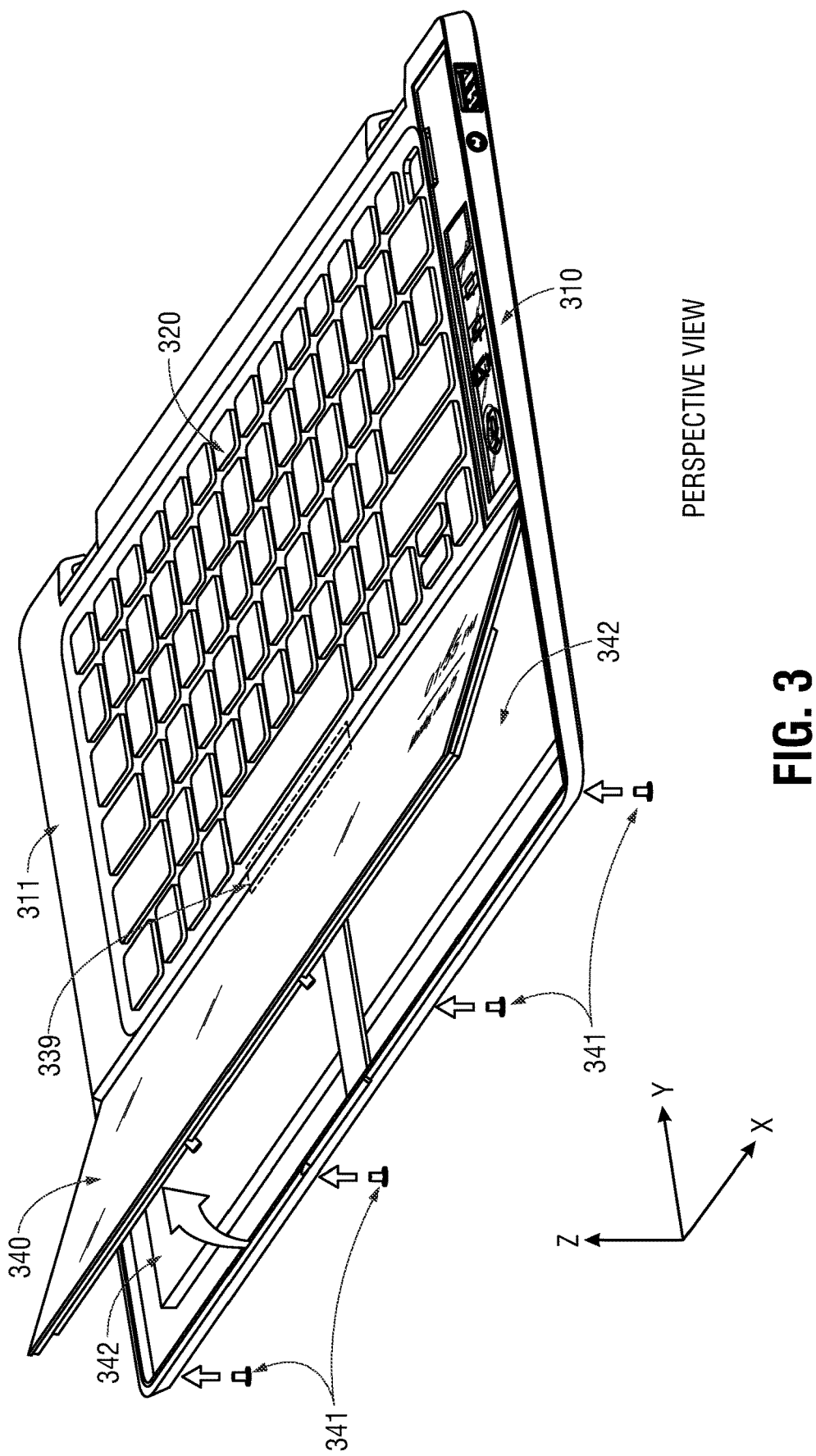
FIG. 3 is a graphical diagram illustrating a perspective view of a base chassis for a mobile information handling system housing batteries and incorporating a removable palm rest and touchpad assembly according to an embodiment of the present disclosure.

FIG. 3 is a graphical diagram illustrating a perspective view of a base chassis without a display chassis shown for a mobile information handling system housing batteries and incorporating a removable palm rest and touchpad assembly for ease of battery replacement according to an embodiment of the present disclosure. The base chassis top cover 311 may be formed in an embodiment with openings for a keyboard 320, and a removable palm rest and touchpad assembly 340. A removable palm rest and touchpad assembly 340, which may be operably connected to the motherboard in an embodiment, and may be fastened to the base chassis top cover 311 or bottom cover 310. For example, the removable palm rest and touchpad assembly 340 may be connected to the base chassis top cover 311 via a hinge that allows for upward lifting of the front edge of the removable palm rest and touchpad assembly 340 facing the user to expose the batteries 342 housed within the base chassis bottom cover 310. The hinge connection may include power and IO data connections at location 339. In other embodiments, the entire removable palm rest and touchpad assembly 340 may be detachable from the power and IO data connection at 339 the base chassis top cover 311, and bottom cover 310. The rotatable edge of the removable palm rest and touchpad assembly 340 in various embodiments herein may further be fastened to the base chassis bottom cover 310 via one or more magnets, screws 341, interference fit, or other fasteners.

The removable palm rest chassis fasteners 341 in an embodiment may be removed from the base chassis bottom cover 310 in order to access, remove, or replace the batteries 342 housed within the base chassis bottom cover 310, without separating the base chassis bottom cover 310 from the base chassis top cover 311. The removable palm rest chassis fasteners 341 may be screws disposed through the bottom of the base chassis bottom cover 310. Magnets may be disposed around the edges of the removable palm rest and touchpad assembly 340 or around the bottom cover 310 in the base chassis to magnetically couple the removable palm rest and touchpad assembly 340 to the base chassis bottom cover 310. The removable palm rest and touchpad assembly 340 may be replaced or rotated back into a downward or closed position in an embodiment, and the removable palm rest chassis fasteners 341 may be reinserted into the base chassis bottom cover 310.

FIG. 4A is a graphical diagram illustrating a perspective view of a mobile information handling system base chassis including an opening for insertion and removal of a replaceable input/output (IO) and power pin/port connector module that does not require separation of the base chassis top and bottom covers according to an embodiment of the present disclosure. As described herein, the replaceable IO and power pin/port connector module in an embodiment may house one or more of a replaceable power pin/port connector and a replaceable IO pin/port connector, for connection by the user to a power cord or IO cord (e.g., USB-A, USB-C, firewire, SATA, etc.). This replaceable IO and power pin/port connector module may be removed and replaced within the base chassis of the mobile information handling system without separating the base chassis top cover from the base chassis bottom cover, and without replacement of the mobile information handling system motherboard.

A base chassis bottom cover 410 may be formed in an embodiment with a power pin/port connector chassis sidewall aperture 412 or an IO pin/port connector chassis sidewall aperture 413 for insertion of a replaceable power pin/port connector 432 and a replaceable IO pin/port connector 433, respectively. The base chassis top cover 411 in an embodiment may be formed with a top cover chassis opening 414 for the replaceable IO and power pin/port connector module 430. The replaceable IO and power pin/port connector module 430 in an embodiment may be removed from or inserted into the top cover chassis opening 414 for the replaceable IO and power pin/port connector module 430. The connector module push/pull tab 431 located on the top surface of the replaceable IO and power pin/port connector module 430 may be pulled by a user to remove the replaceable IO and power pin/port connector module 430 from the mobile information handling system top cover chassis opening 414 in an embodiment.

Figure 4B:
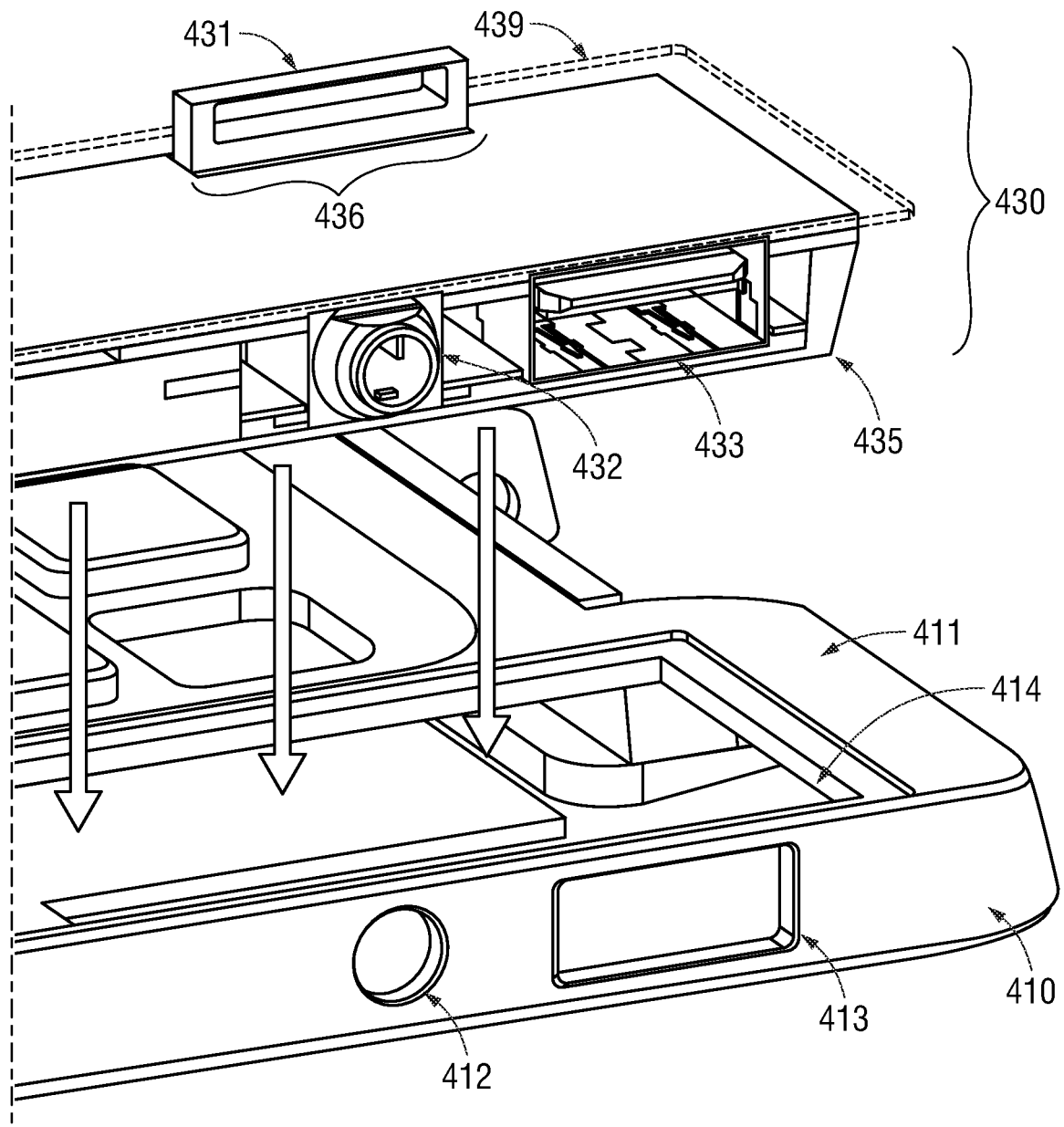
FIG. 4B is a graphical diagram illustrating a perspective view of a mobile information handling system base chassis including sidewall apertures for insertion and removal of power and IO pin/port connectors according to an embodiment of the present disclosure.

FIG. 4B is a graphical diagram illustrating a perspective view of portion of a mobile information handling system base chassis including sidewall apertures for insertion and removal of power and input/output (IO) pin/port connectors within a replaceable IO and power pin/port connector module according to an embodiment of the present disclosure. A base chassis bottom cover 410 may be formed in an embodiment with sidewall apertures 412 and 413 for a power pin/port connector 432 and an input/output (IO) pin/port connector 433, respectively, housed within a replaceable IO and power pin/port connector module 430. A base chassis top cover 411 may be formed in an embodiment with a replaceable IO and power pin/port connector module chassis opening 414 sized to receive the replaceable IO and power pin/port connector module 430.

A replaceable IO and power pin/port connector module housing 435 may be formed in an embodiment within which such a power pin/port connector 432 and IO pin/port connector 433 may be at least partially disposed. A connector module push/pull tab 431 may be at least partially disposed within the replaceable IO and power pin/port connector module housing 435, and movably inserted through a module push/pull tab opening 436 within a connector module top cover 439 that may be joined to the replaceable IO and power pin/port connector module housing 435. The replaceable IO and power pin/port connector module 430 in an embodiment may be removed and replaced by a replacement replaceable IO and power pin/port connector module through insertion into the mobile information handling system base chassis opening 414 for the replaceable IO and power pin/port connector module 430 in an embodiment, without separating the base chassis top cover 411 from the base chassis bottom cover 410 or replacing the motherboard of the mobile information handling system.

Figure 4C:
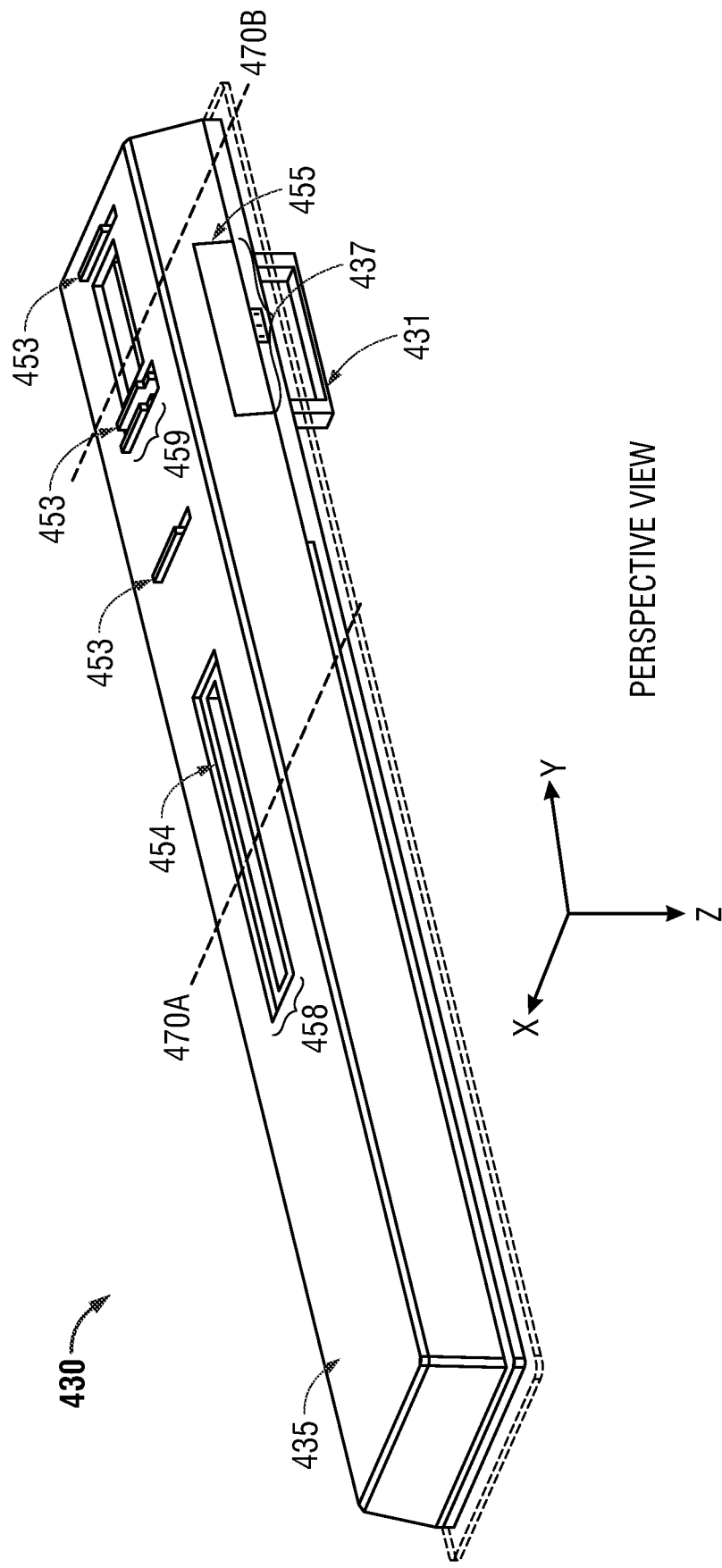
FIG. 4C is a graphical diagram illustrating a perspective view of the bottom side of a replaceable IO and power pin/port connector module according to an embodiment of the present disclosure.

FIG. 4C is a graphical diagram illustrating a perspective view of the bottom side of a replaceable input/output (IO) and power pin/port connector module for insertion within a mobile information handling system base chassis according to an embodiment of the present disclosure. As described herein, a replaceable IO and power pin/port connector module 430 in an embodiment may be removed and replaced within the base chassis of the mobile information handling system without replacing the motherboard because the replaceable IO and power pin/port connector module 430 may include a module-sided motherboard connector 454 that mates with the motherboard for the mobile information handling system upon insertion of the replaceable input/output (IO) and power pin/port connector module 430 within the base chassis.

A replaceable IO and power pin/port connector module housing 435 may be formed in an embodiment to include an opening 458 with a module-sided motherboard connector 454 disposed therein for engagement with a motherboard-sided module connector (461 in FIG. 4D) and one or more openings 459 for a module housing sliding tray 453. The openings 459 for the module housing sliding tray 453 may serve to guide the module housing sliding tray to slide for insertion of power pin/ports 432 and IO pin ports 433 into respective sidewall apertures 412 and 413 upon installation of the replaceable input/output (IO) and power pin/port connector module 430 according to embodiments herein. A connector module circuit board may be fixed in an embodiment within the replaceable IO and power pin/port connector module housing 435 such that a portion of the sliding circuit board tray 453 is disposed through the module housing sliding tray openings 459, and the module-sided motherboard connector 454 is partially disposed through the motherboard-sided module connector opening 458. The module-sided motherboard connector 454 may mate with a motherboard-sided module connector disposed in the base chassis of the mobile information handling system via the motherboard-sided module connector opening 458 within the replaceable IO and power pin/port connector module housing 435 in an embodiment.

A circuit connector module lock spring 455 in an embodiment may be fixed to the replaceable IO and power pin/port connector module housing 435 such that it is partially disposed across a module lock spring opening 437 within the housing 435, allowing the module lock spring 455 to bow outward and into a base chassis lock spring opening as downward force (this would appear as upward force in FIG. 4C, since FIG. 4C displays the module 430 upside down) is applied to the connector module push/pull tab 431 (this is described in greater detail below with respect to FIGS. 5A, 5B, and 5D, below). The circuit connector module lock spring 455 in an embodiment may be comprised of a flexible material, such as a flexible metal sheet (e.g., aluminum or copper), or other various types of plastics or flexible compounds known in the art to be suitable spring materials. This may operate to lock the replaceable IO and power pin/port connector module 430 into place within the mobile information handling system base chassis. FIG. 4E below illustrates a cross-sectional view of the replaceable IO and power pin/port connector module 430 from a vertical plane cut out along line 470A. FIGS. 5B and 5D below illustrate cross-sectional views of the replaceable IO and power pin/port connector module 430 from a vertical plane cut out along line 470B.

Figure 4D:
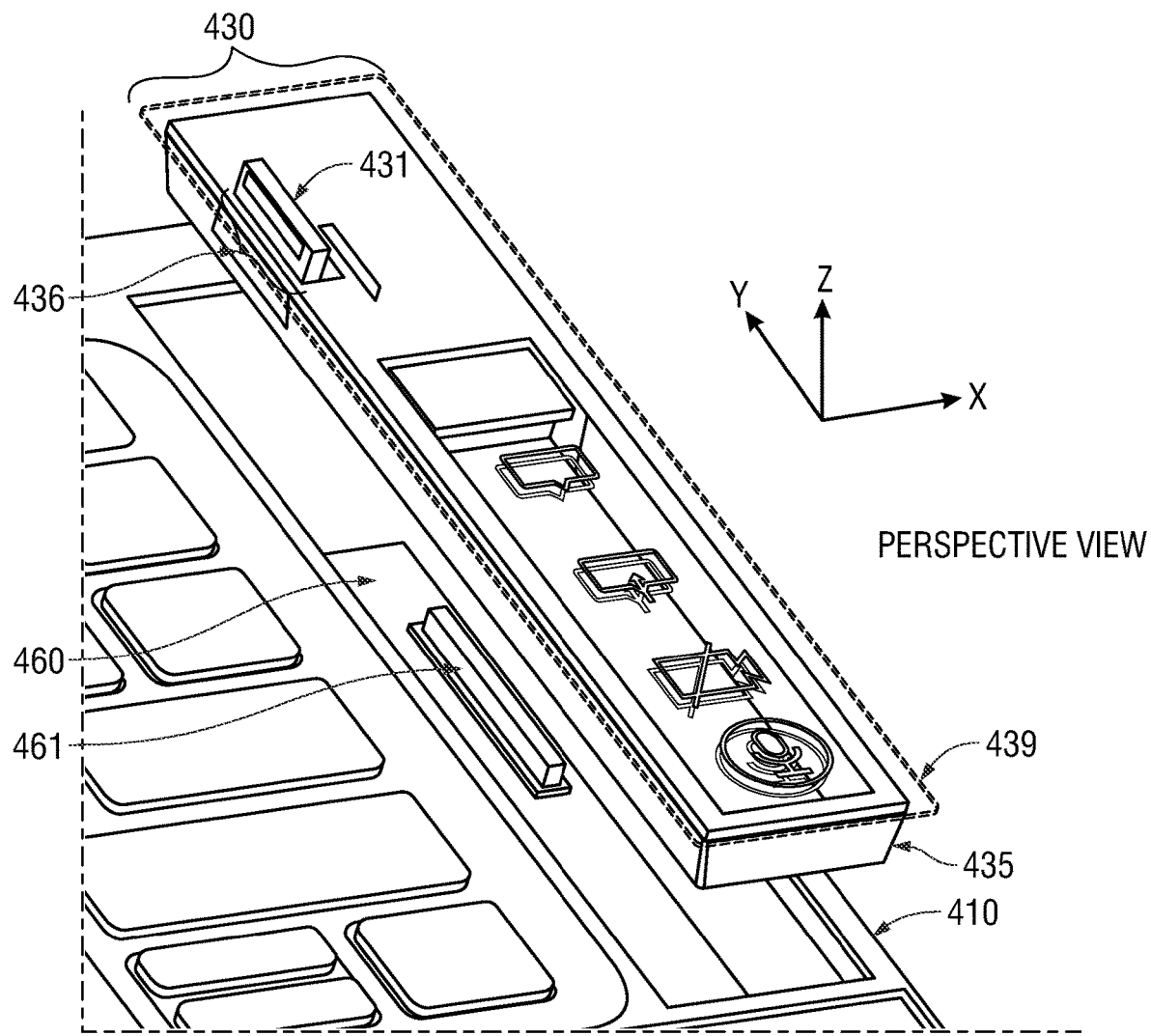
FIG. 4D is a graphical diagram illustrating a perspective view of a replaceable IO and power pin/port connector module for mating with a motherboard housed within a mobile information handling system base chassis according to an embodiment of the present disclosure.
Figure 4E:
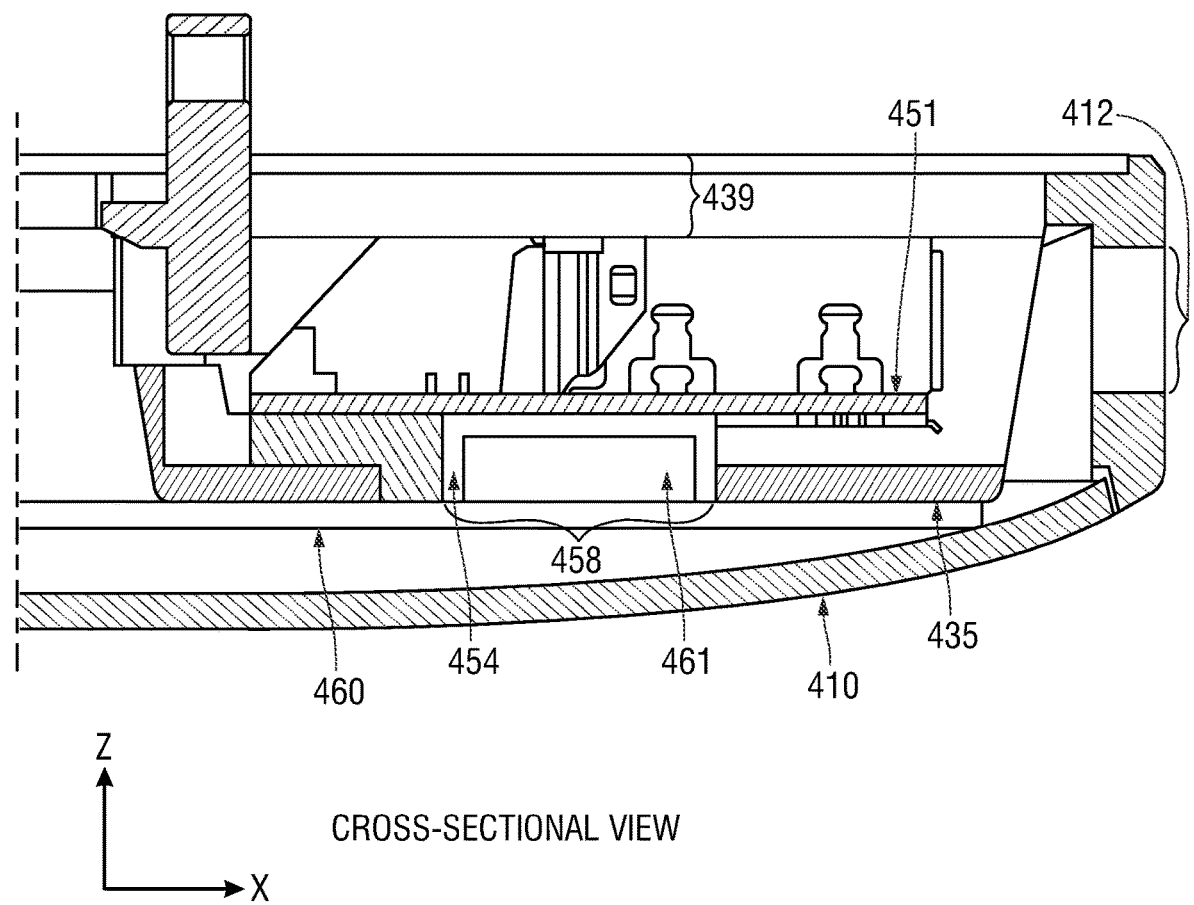
FIG. 4E is a graphical diagram illustrating a cross-sectional view of a replaceable IO and power pin/port connector module for mating with a motherboard according to an embodiment of the present disclosure.

FIG. 4D is a graphical diagram illustrating a perspective view of a replaceable IO and power pin/port connector module for mating with a motherboard housed within a mobile information handling system base chassis without separating the base chassis upper and bottom covers according to an embodiment of the present disclosure. As described herein, a replaceable IO and power pin/port connector module 430 in an embodiment may be removed and replaced within the base chassis bottom cover 410 of the mobile information handling system without replacing the motherboard 460 because the replaceable IO and power pin/port connector module 430 may include a connector that mates with the motherboard for the mobile information handling system upon insertion of the replaceable IO and power pin/port connector module 430 and its housing 435 within the base chassis bottom cover 411 in an opening 414 sized to accept the replaceable IO and power pin/port connector module 430.

A motherboard 460 of the mobile information handling system, including a processor and a motherboard-sided module connector 461, may be inserted within the base chassis bottom cover 410 in an embodiment. A replaceable IO and power pin/port connector module housing 435 may be formed in an embodiment to include an opening to receive a motherboard-sided module connector 461. A module-sided motherboard connector 454 (shown in FIG. 4C on the bottom surface of the replaceable IO and power pin/port connector module 430) may be partially disposed through a motherboard-sided module connector opening 458 within the replaceable IO and power pin/port connector module housing 435, for mating with the motherboard-sided module connector 461, shown in FIG. 4D. The module-sided motherboard connector 454 may be operably connected in an embodiment to the connector module circuit board 451 (in FIG. 4E). A connector module top cover 439 in an embodiment may be affixed to the replaceable IO and power pin/port connector module housing 435 such that a portion of the connector module push/pull tab 431 is disposed through the module push/pull tab opening 436 in the connector module top cover 439.

The replaceable IO and power pin/port connector module housing 435 in an embodiment may at least partially house power and IO pin/port connectors 432 and 433 respectively, and a connector module circuit board 451 operably connected to a module-sided motherboard connector 454 for mating with the motherboard-sided module connector 461. Such a mating with the motherboard-sided module connector 461 may operably connect the power and IO pin/port connectors 432 and 433 housed within the replaceable IO and power pin/port connector module housing 435 to the motherboard 460 of the mobile information handling system.

FIG. 4E is a graphical diagram illustrating a cross-sectional view of a replaceable IO and power pin/port connector module for mating with a motherboard housed within a mobile information handling system base chassis without separating the base chassis upper and bottom covers according to an embodiment of the present disclosure. A motherboard 460, including a processor for a mobile information handling system may be inserted within the base chassis bottom cover 410 having a side aperture 412 or 413 in an embodiment. A module-sided motherboard connector 454 may mate with a motherboard-sided module connector 461 via motherboard-sided module connector opening 458 within the replaceable IO and power pin/port connector module housing 435. Replaceable IO and power pin/port connector module housing 435 may be joined to the connector module top cover 439, made of glass, acrylic, other plastic, aluminum, or another material, to form the replaceable IO and power pin/port connector module in an embodiment. Such a mating of the module-sided motherboard connector 454 with the motherboard-sided module connector 461 may operably connect a connector module circuit board 451 housed within the replaceable IO and power pin/port connector module housing 435 to the motherboard 460 of the mobile information handling system.

Figure 5A:
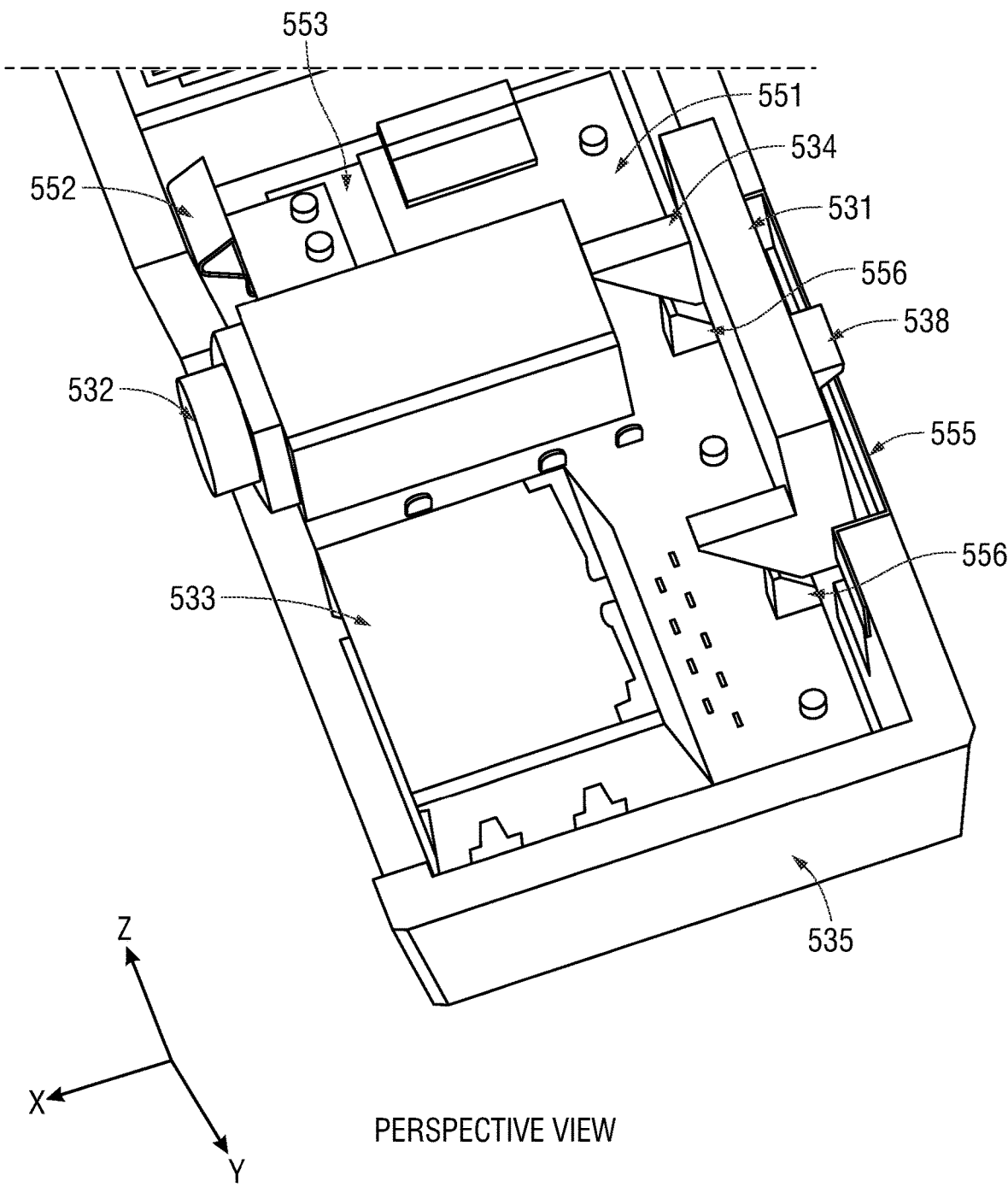
FIG. 5A is a graphical diagram illustrating a perspective view of a replaceable IO and power pin/port connector module housing according to an embodiment of the present disclosure.
Figure 5B:
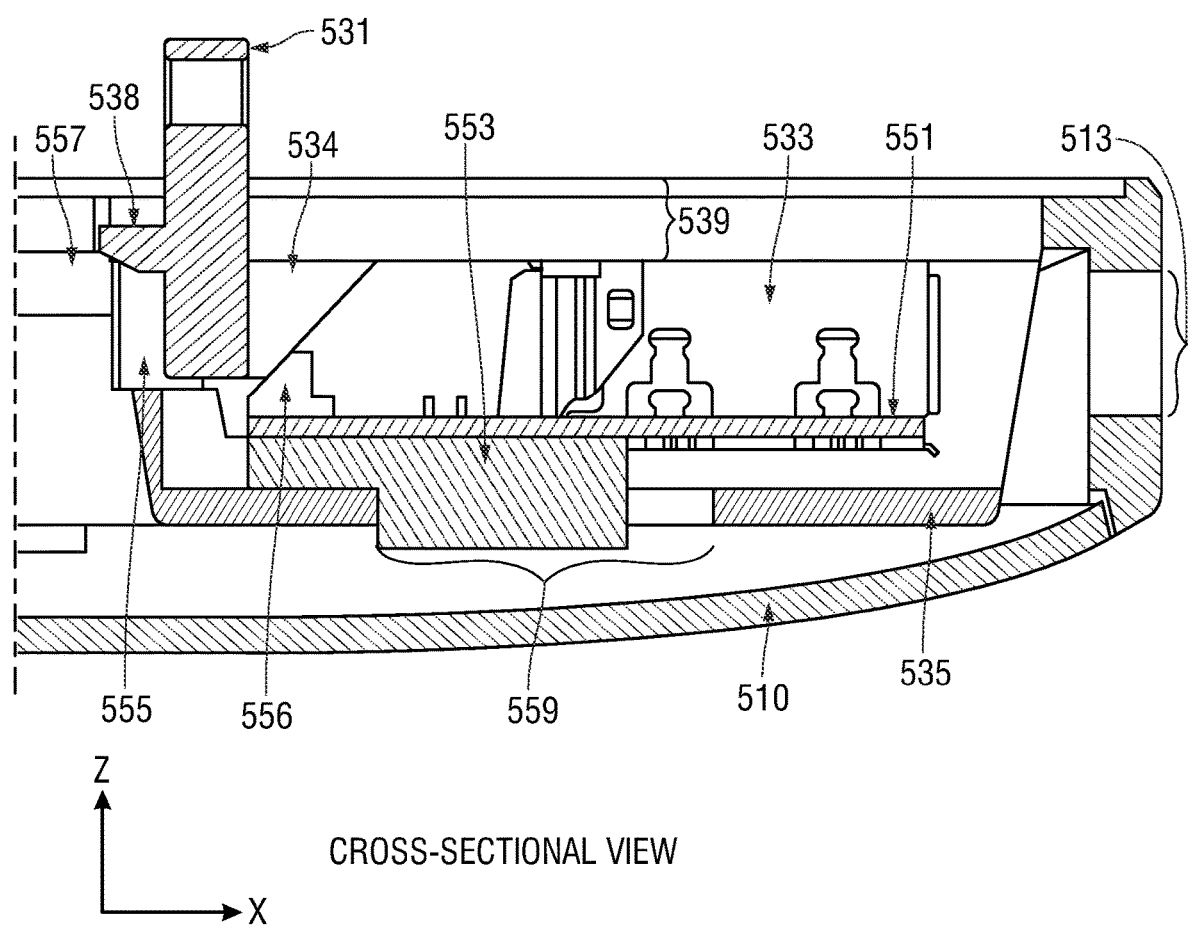
FIG. 5B is a graphical diagram illustrating cross-sectional view of a replaceable IO and power pin/port connector module in an unlocked position within a base chassis according to an embodiment of the present disclosure.

FIG. 5A is a graphical diagram illustrating a perspective view of a replaceable input/output (IO) and power pin/port connector module housing for at least partially enclosing power and IO pin/port connectors according to an embodiment of the present disclosure. A replaceable IO and power pin/port connector module housing 535 may be formed in an embodiment to include an opening for a motherboard-sided module connector and module housing sliding tray opening, as described in greater detail above with respect to FIG. 4C. A power pin/port connector 532, IO pin/port connector 533, and module-sided motherboard connector (as described in greater detail above at FIG. 4C and below at FIGS. 5B and 5D) may be operably connected in an embodiment to a connector module circuit board 551. The connector module circuit board 551 in an embodiment may be affixed to a sliding circuit board tray 553 having circuit board tray slide notches 556.

A circuit board tray counterforce spring 552 in an embodiment may be affixed to the sliding circuit board tray 553 for countering sliding movement of the sliding circuit board tray 553 in the X direction (e.g., toward the left-side wall of the replaceable IO and power pin/port connector module housing 535 shown in FIG. 5A). The connector module circuit board 551 may be fixed in an embodiment within the replaceable IO and power pin/port connector module housing 535 such that a portion of the sliding circuit board tray 553 is disposed through module housing sliding tray openings and the module-sided motherboard connector is partially disposed through the motherboard-sided module connector opening in the bottom surface of the replaceable IO and power pin/port connector module housing 535 (e.g., as shown in greater detail at FIG. 4C). A circuit connector module lock spring 555 in an embodiment may be fixed to the replaceable IO and power pin/port connector module housing 535 such that it is partially disposed across a module lock spring opening (e.g., as shown in FIG. 4C). This may allow the module lock spring 555 to bow outward (in the negative X direction) and into a base chassis lock spring opening within a sidewall of a base chassis bottom cover opening that receives the replaceable IO and power pin/port connector module housing 535 as downward force is applied to the connector module push/pull tab 531. This may operate to lock the replaceable IO and power pin/port connector module housing 535 into place within the mobile information handling system base chassis with this side base chassis lock spring opening. The connector module push/pull tab 531 in an embodiment, includes an upper flange 538 disposed such that the upper flange 538 is in contact with the connector module lock spring 555. Replaceable IO and power pin/port connector module housing 535 includes one or more lower flanges 534 and the lower flanges 534 are disposed on the push/pull tab 531 to engage with the circuit board tray slide notches 556.

A user may apply downward force on the connector module push/pull tab 531 to cause the upper flange 538 to bow the connector module lock spring 555 outward in the negative X direction into a base chassis lock spring opening to lock the replaceable IO and power pin/port connector module 530 in the opening in the base chassis sized to receive the replaceable IO and power pin/port connector module 530 in an embodiment. This bowed portion of the connector module lock spring 555 may lock beneath a ceiling of the base chassis lock spring opening (e.g., as described in greater detail below with respect to 557 in FIGS. 5B and 5D) to prohibit upward vertical movement of the replaceable IO and power pin/port connector module housing 535 with respect to the base chassis of the information handling system in an embodiment. The push/pull tab lower flanges 534 in an embodiment may push against the circuit board tray slide notches 556 to cause the sliding circuit board tray 553 to slide toward the power and IO pin/port connector chassis sidewall apertures within the base chassis bottom cover (e.g., as described in greater detail with respect to FIGS. 5B and 5D), and guided by the module housing sliding tray openings (e.g., 559 in FIG. 5B below) until the sliding circuit board tray counterforce spring 552 prohibits further movement in the positive X direction.

FIG. 5B is a graphical diagram illustrating cross-sectional view of a replaceable input/output (IO) and power pin/port connector module inserted within a mobile information handling system base chassis in an unlocked position according to an embodiment of the present disclosure. As described herein, the replaceable IO and power pin/port connector module in an embodiment may house a sliding circuit board tray that is operably connected to replaceable module power or IO pin/port connectors. The sliding circuit board tray in an embodiment may allow for sliding of these connectors (e.g., 533) toward or into openings (e.g., 513) within the mobile information handling system base chassis bottom cover 510 upon insertion of the replaceable IO and power pin/port connector module within the base chassis bottom cover 510. This sliding circuit board tray in an embodiment may also allow for sliding of these connectors (e.g., 533) away from these openings (e.g., 513) and further within the mobile information handling system base chassis bottom cover 510 for upward movement (in the positive Z direction) and removal of the replaceable IO and power pin/port connector module from the base chassis bottom cover 510. FIG. 5B illustrates the replaceable IO and power pin/port connector module in an unlocked position with respect to the mobile information handling system base chassis, where a connector module lock spring 555 is not engaged with or displaced within a base chassis lock spring opening 557, and the replaceable IO and power pin/port connector module may be moved vertically with respect to the base chassis.

A base chassis bottom cover 510 may be formed in an embodiment with openings (e.g., IO pin/port connector chassis sidewall aperture 513) for a power pin/port connector and an input/output (IO) pin/port connector. A replaceable IO and power pin/port connector module housing 535 may be formed in an embodiment to include an opening for a motherboard-sided module connector (e.g., 458 shown in FIG. 4C) and a module housing sliding tray opening 559. The connector module circuit board 551 in an embodiment may be affixed to the sliding circuit board tray 553 having circuit board tray slide notches 556. In an embodiment, the connector module circuit board 551 may be fixed within the replaceable IO and power pin/port connector module housing 535 such that a portion of the sliding circuit board tray 553 is disposed through the module housing sliding tray openings 559. Further, the module-sided motherboard connector is partially disposed through the motherboard-sided module connector opening (as shown in greater detail above with respect to FIG. 4C).

As described in greater detail below with respect to FIGS. 4C and 4D, a replaceable IO and power pin/port connector module in an embodiment may be removed and replaced within the base chassis bottom cover 510 of the mobile information handling system without replacing the motherboard because the replaceable IO and power pin/port connector module may include a connector that mates with the motherboard for the mobile information handling system upon insertion of the module within the base chassis bottom cover 510. The replaceable IO and power pin/port connector module housing 535 in an embodiment may at least partially house power and IO pin/port connectors (e.g., 533), and a connector module circuit board 551 operably connected to a module-sided motherboard connector for mating with the motherboard-sided module connector. Such a mating with the motherboard-sided module connector may operably connect the power and IO pin/port connectors (e.g., 533) housed within the replaceable IO and power pin/port connector module housing 535 to the motherboard of the mobile information handling system.

A circuit connector module lock spring 555 in an embodiment may be fixed to the replaceable IO and power pin/port connector module housing 535 such that it is partially disposed across the module lock spring opening (e.g., 437 of FIG. 4C). The connector module push/pull tab 531 in an embodiment, including upper flange 538 and lower flanges 534 may be disposed such that the upper flange 538 is in contact with the connector module lock spring 555 and the lower flanges 534 are in contact with the circuit board tray slide notches 556. Upon pushing connector module push/pull tab 531, the upper flange 538 will push connector module lock spring 555 into base chassis lock spring opening 557 in a sidewall of the same chassis 510 to lock the replaceable IO and power pin/port connector module 530 in the base chassis. A connector module top cover 539 in an embodiment may be affixed to the replaceable IO and power pin/port connector module housing 535 such that a portion of the connector module push/pull tab 531 is disposed through the module push/pull tab opening (e.g., 436 of FIG. 4D). Push/pull tab lower flanges 534 in an embodiment may push against circuit board tray slide notches 556 to cause the sliding circuit board tray 553 to slide the connector module circuit board 551 and connector 533, as guided by the module housing sliding tray openings 559, toward the power and IO pin/port connector chassis sidewall apertures (e.g., 513) until a sliding circuit board tray counterforce spring prohibits further movement. The sliding circuit board tray 553 is partially disposed through the module housing slide tray openings 559.

Figure 5C:
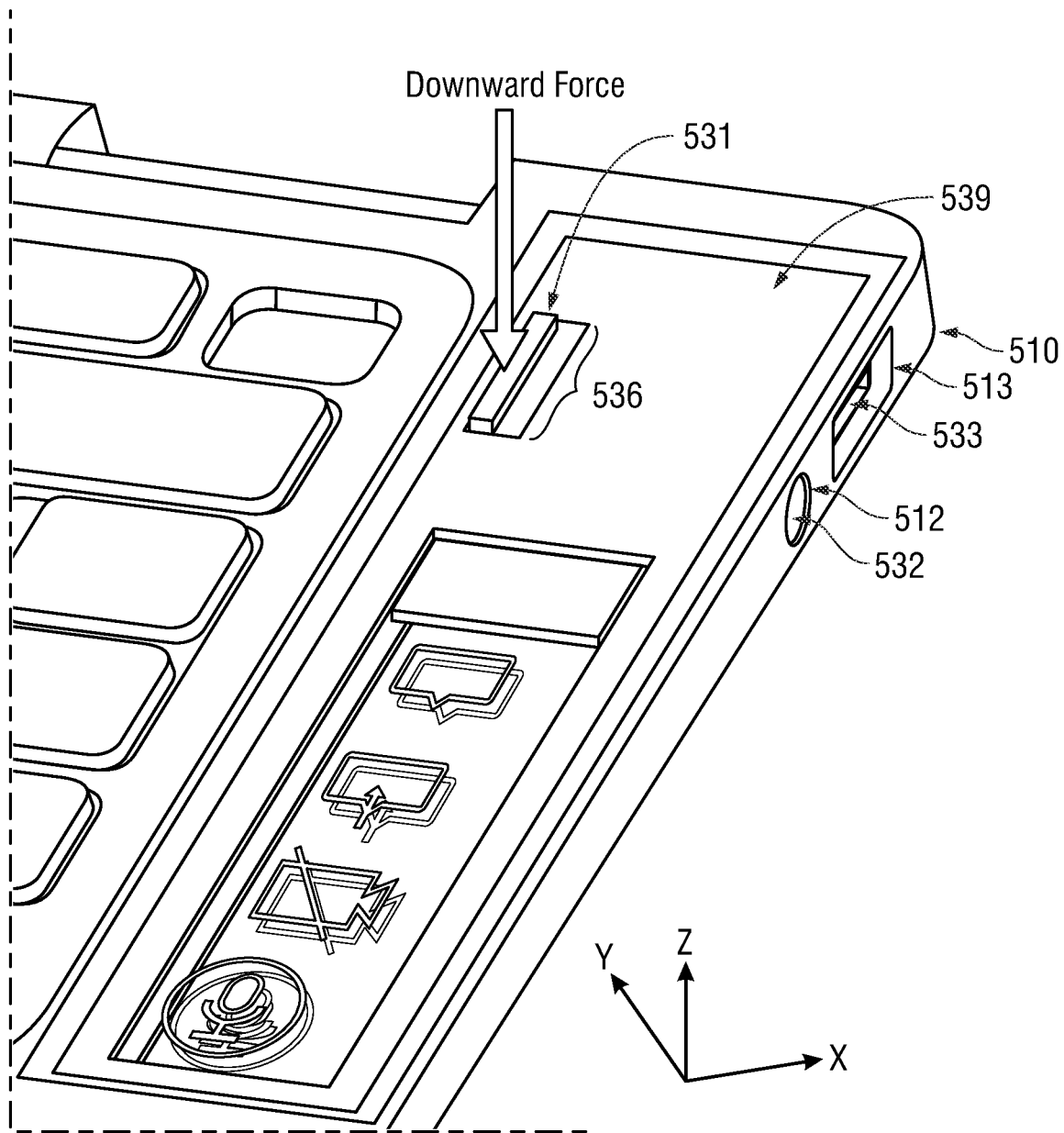
FIG. 5C is a graphical diagram illustrating a perspective view of a replaceable IO and power pin/port connector module placed into a locked position according to an embodiment of the present disclosure.
Figure 5D:
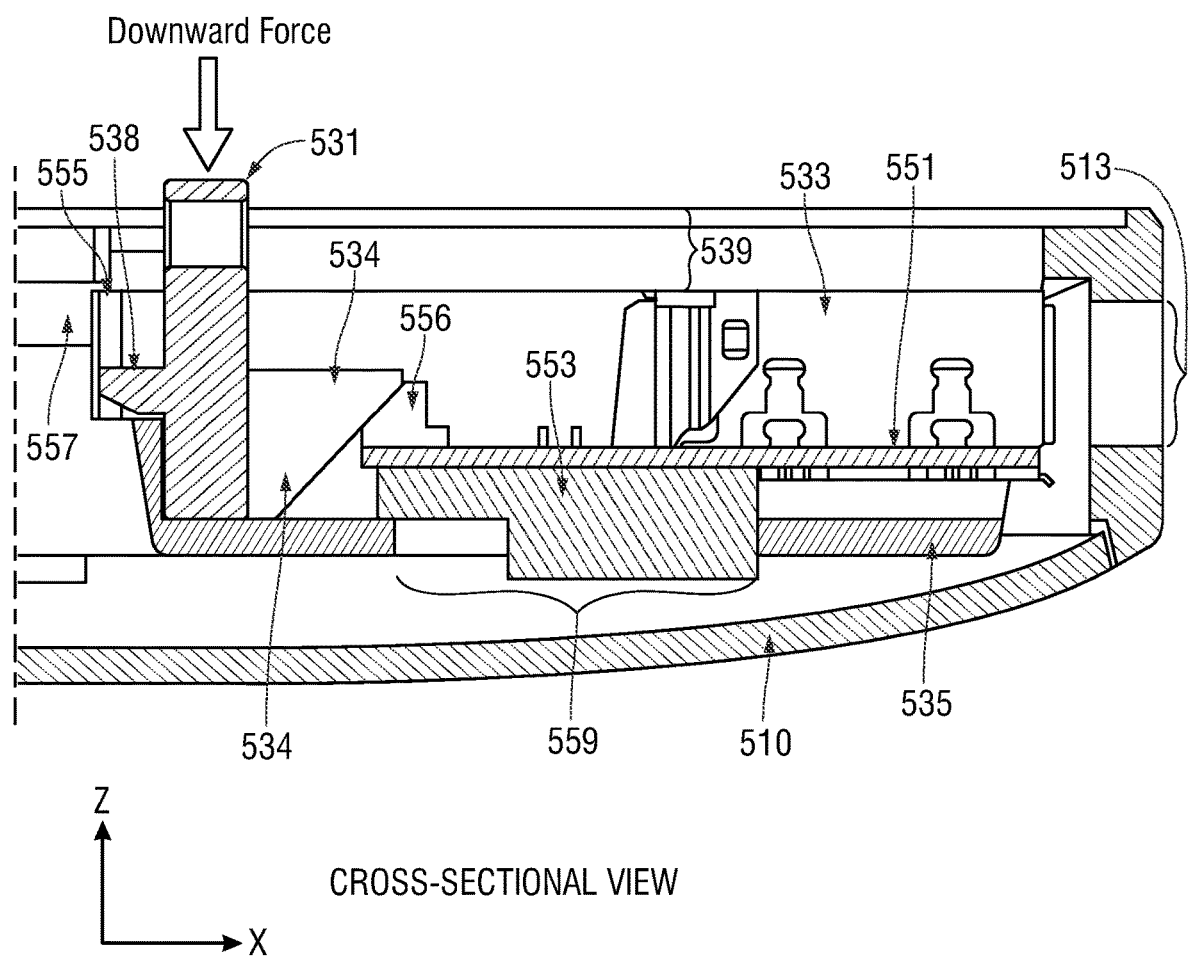
FIG. 5D is a graphical diagram illustrating cross-sectional view of a replaceable IO and power pin/port connector module in a locked position within a base chassis according to an embodiment of the present disclosure.

FIG. 5C is a graphical diagram illustrating a perspective view of downward force applied to a connector module push/pull tab to place a replaceable input/output (IO) and power pin/port connector module into a locked position within a mobile information handling system base chassis according to an embodiment of the present disclosure. A connector module push/pull tab 531 may be disposed through a module push/pull tab opening 536 in the connector module top cover 539. A user may apply downward force on the connector module push/pull tab 531 to cause the push/pull tab upper flange to bow a connector module lock spring outward and into a base chassis lock spring opening in a sidewall of the opening in the base chassis bottom cover 510 sized for receiving the replaceable IO and power pin/port connector module 530 of embodiments herein (e.g., as described in greater detail below with respect to FIG. 5D). This downward force may also cause the push/pull tab lower flanges to also push the circuit board tray slide notches 556 to slide and the sliding circuit board tray in the positive X direction (e.g., as described in greater detail below with respect to FIG. 5D) toward sidewall apertures (e.g., 513). Such positive X direction movement of the sliding circuit board tray 553 in an embodiment may cause a replaceable power pin/port connector 532 and a replaceable IO pin/port connector 533 to become accessible to a user for insertion of power or IO cables via one or more sidewall apertures (e.g., 513) within the information handling system base chassis bottom cover 510.

FIG. 5D is a graphical diagram illustrating cross-sectional view of a replaceable input/output (IO) and power pin/port connector module inserted within a mobile information handling system base chassis in a locked position according to an embodiment of the present disclosure. The sliding circuit board tray in an embodiment may allow for sliding of power and IO pin/port connectors (e.g., 533) toward or into sidewall apertures (e.g., 513) within the mobile information handling system base chassis bottom cover 510 upon insertion of the replaceable IO and power pin/port connector module within the base chassis bottom cover 510 upon lifting of the connector module push/pull tab 531. This sliding circuit board tray in an embodiment may also allow for sliding of these connectors (e.g., 533) away from these openings (e.g., 513) and further within the mobile information handling system base chassis bottom cover 510 for upward movement (in the positive Z direction) and removal of the replaceable IO and power pin/port connector module from the base chassis bottom cover 510. FIG. 5D illustrates the replaceable IO and power pin/port connector module in a locked position with respect to the mobile information handling system base chassis, where the replaceable IO and power pin/port connector module housing 535 may not be lifted out vertically with respect to the base chassis bottom cover 510 while connector 533 is engaged in sidewall aperture 513.

A base chassis bottom cover 510 may be formed in an embodiment with sidewall apertures (e.g., 513) for a power pin/port connector (e.g., as shown in FIG. 4B at 412 and 432) and sidewall aperture 513 for an input/output (IO) pin/port connector 533. A replaceable IO and power pin/port connector module housing may be formed in an embodiment to include a module housing sliding tray opening 559. The connector module circuit board 551 in an embodiment may be affixed to a sliding circuit board tray 553 having circuit board tray slide notches 556. The connector module circuit board 551 may be fixed in an embodiment within the replaceable IO and power pin/port connector module housing 535 such that a portion of the sliding circuit board tray 553 is disposed through the module housing sliding tray openings 559.

A user may apply downward force on the connector module push/pull tab 531 to bow a connector module lock spring 555 outward with respect to the replaceable IO and power pin/port connector module housing 535, in the negative X direction, in an embodiment. A portion of the connector module lock spring 555 that bows outward in such a way may lock beneath a ceiling of a base chassis lock spring opening 557 in a sidewall of the opening in base chassis bottom cover 510 that is sized to receive the replaceable IO and power pin/port connector module housing 535. This prohibits upward vertical lifting movement (in the positive Z direction) with respect to the base chassis bottom cover 510 of the replaceable IO and power pin/port connector module housing 535 in an embodiment. Thus, the replaceable IO and power pin/port connector module is in a locked position with respect to the mobile information handling system base chassis 510 in an embodiment. Push/pull tab lower flanges 534 in an embodiment may push against circuit board tray slide notches 556 to cause the sliding circuit board tray 553 to slide toward the power and IO pin/port connector chassis sidewall apertures (e.g., 513) until a sliding circuit board tray counterforce spring prohibits further movement in the positive X direction. Sliding the sliding circuit board tray 553 to slide toward the power and IO pin/port connector chassis sidewall apertures (e.g., 513) is guided by the module housing sliding tray openings 559. A replaceable IO pin/port connector 533 in an embodiment may insert into an IO pin/port connector base chassis sidewall aperture 513. This may occur because the replaceable IO pin/port connector 533 is fixed to the sliding circuit board tray 553, and thus, may move in the positive or negative X direction along with the sliding circuit board tray 553. Although not shown in FIG. 5D, the replaceable power pin/port connector (e.g., 532 of FIG. 5A) may also be fixed to the sliding circuit board tray 553, and may similarly move in the positive or negative X direction along with the sliding circuit board tray 553. Thus, in another aspect of an embodiment, although not shown here, the replaceable power pin/port connector (e.g., 532 of FIG. 5A) may insert into a power pin/port connector base chassis sidewall aperture (e.g., 412 of FIG. 4A) with downward force applied to the connector module push/pull tab 531.

Figure 5E:
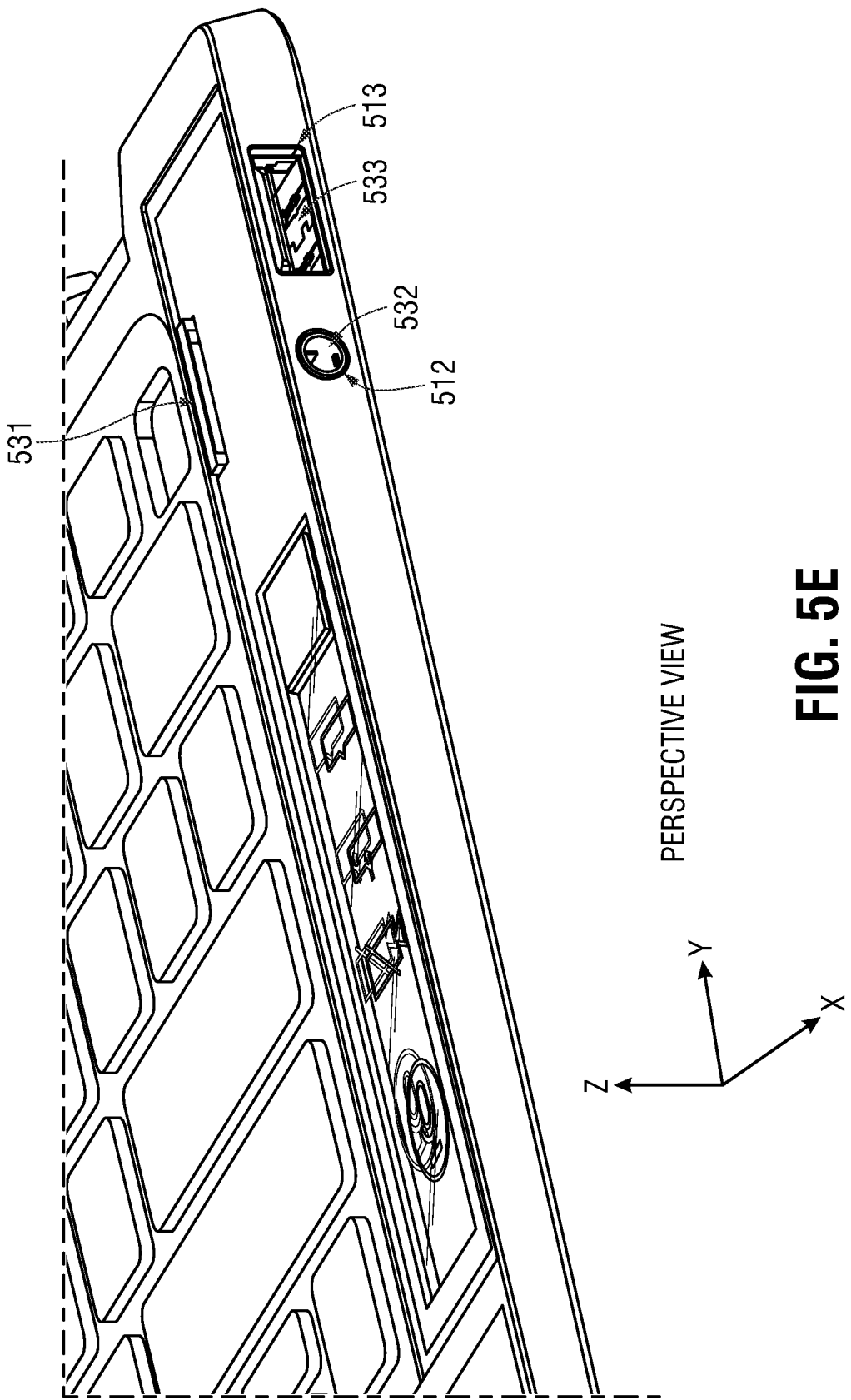
FIG. 5E is a graphical diagram illustrating a perspective view of IO and power pin/port connectors inserted within side apertures of a mobile information handling system base chassis according to an embodiment of the present disclosure.

FIG. 5E is a block diagram illustrating a perspective view of input/output (IO) and power pin/port connectors of a replaceable IO pin/port connector module inserted within sidewall apertures of a mobile information handling system base chassis for attachment to power or IO cord connectors according to an embodiment of the present disclosure. The replaceable IO pin/port connector 533 in an embodiment may insert into an IO pin/port connector base chassis sidewall aperture. As described herein, this may occur because the replaceable IO pin/port connector 533 is fixed to the sliding circuit board tray (e.g., 553 of FIG. 5D), and thus, may move in the positive or negative X direction along with the sliding circuit board tray. The replaceable power pin/port connector 532 may also be fixed to the sliding circuit board tray (e.g., 553 of FIGS. 5A and 5D), and may similarly move in the positive or negative X direction along with the sliding circuit board tray. Thus, in another aspect of an embodiment, the replaceable power pin/port connector 532 may insert into a power pin/port connector base chassis sidewall aperture 512 with downward force applied to the connector module push/pull tab 531.

Figure 6:
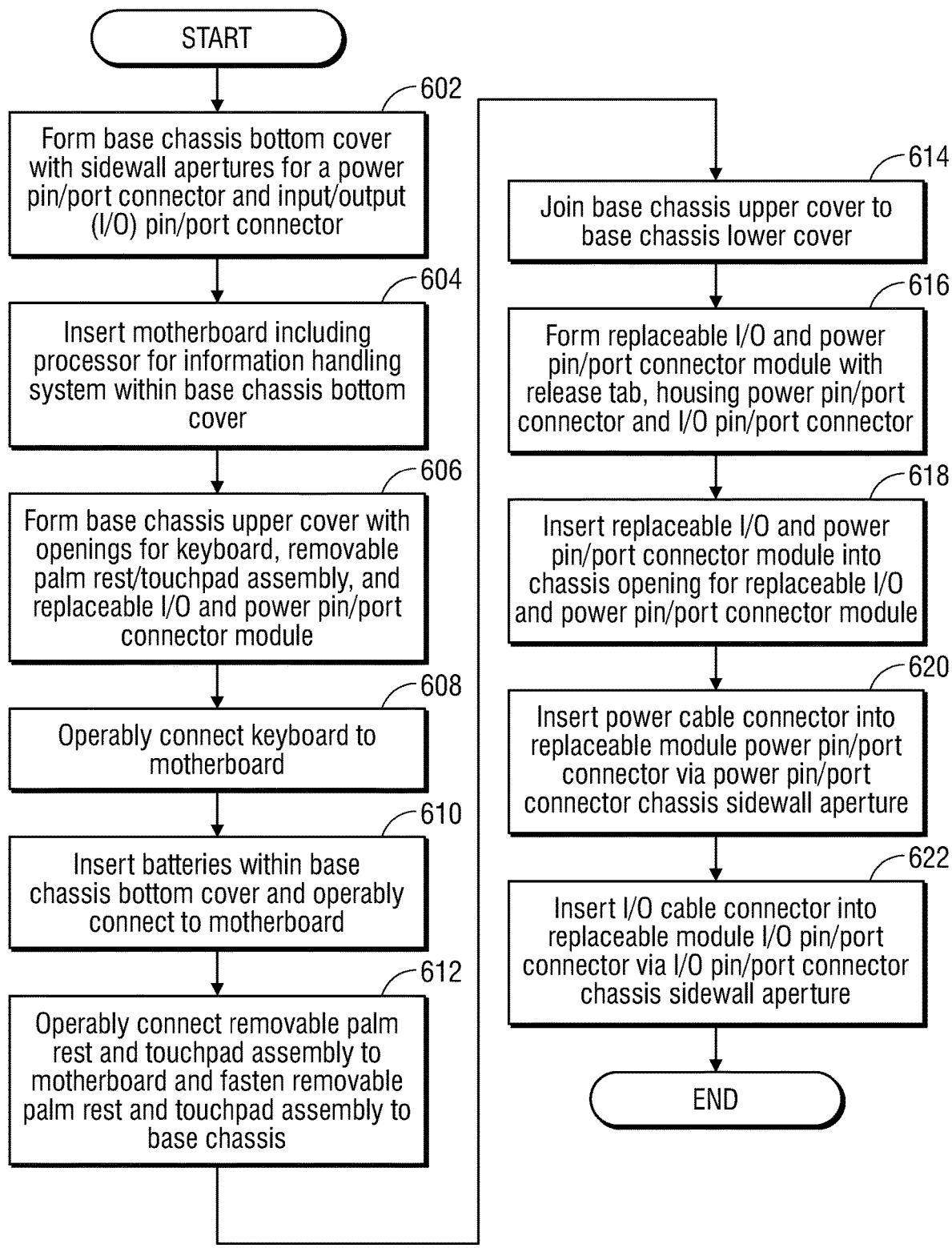
FIG. 6 is a flow diagram illustrating a method of forming a mobile information handling system chassis incorporating a removable palm rest and touchpad assembly and a replaceable IO and power pin/port connector module according to an embodiment of the present disclosure.

FIG. 6 is a flow diagram illustrating a method of forming a mobile information handling system chassis incorporating a replaceable IO and power pin/port connector module and a removable palm rest and touchpad assembly for ease of battery replacement according to an embodiment of the present disclosure. As described herein, the replaceable IO and power pin/port connector module and removable palm rest and touchpad assembly in an embodiment may allow the user to move the removable palm rest and touchpad assembly to access and replace batteries and to remove and replace the replaceable IO and power pin/port connector module for connector replacement without separating the base chassis top cover from the base chassis bottom cover.

At block 602, a base chassis bottom cover may be formed in an embodiment with sidewall apertures for a power pin/port connector and an input/output (IO) pin/port connector. For example, in an embodiment described with reference to FIG. 4A, a base chassis bottom cover 410 may be formed in an embodiment with a power pin/port connector chassis sidewall aperture 412 or an IO pin/port connector chassis sidewall aperture 413 for insertion of a replaceable power pin/port connector 432 and a replaceable IO pin/port connector 433, respectively. In another example embodiment described with respect to FIG. 4B, a base chassis bottom cover 410 may be formed in an embodiment with sidewall apertures 412 and 413 for a power pin/port connector 432 and an input/output (IO) pin/port connector 433, respectively, housed within a replaceable IO and power pin/port connector module 430. In yet another example embodiment described with reference to FIG. 5B, a base chassis bottom cover 510 may be formed in an embodiment with sidewall apertures (e.g., IO pin/port connector chassis sidewall aperture 513) for a power pin/port connector and an input/output (IO) pin/port connector.

At block 604, a motherboard including a processor for an information handling system may be inserted within the base chassis bottom cover in an embodiment. For example, in an embodiment described with reference to FIGS. 4D and 4E, a motherboard 460 of the mobile information handling system, including a processor, may be inserted within the base chassis bottom cover 410 in an embodiment. In another example embodiment described with respect to FIG. 1, the processor 101 may be incorporated within a motherboard of the information handling system 100 which may be further operably connected to various components (e.g., power management unit 104, keyboard controller 121, replaceable power and IO pin/port connector module 130) via bus 108.

A base chassis top cover may be formed in an embodiment at block 606 with openings for a keyboard, a removable palm rest/touchpad assembly, and a replaceable IO and power pin/port connector module. For example, in an embodiment described with respect to FIGS. 4A, and 4B, the base chassis top cover 411 in an embodiment may be formed with an opening 414 for receiving the replaceable IO and power pin/port connector module 430. In another example, in an embodiment described with respect to FIG. 2, a base chassis top cover 211 may be formed with openings to receive a keyboard 220, a removable palm rest/touchpad assembly 240, and a replaceable IO and power pin/port connector module 230. In an embodiment, the replaceable IO and power pin/port connector module 230 may be removable and replaceable without separating the base chassis top cover 211 from the base chassis bottom cover 210 to replace connectors. Because such a replaceable IO and power pin/port connector module 230 in an embodiment may also house a power or IO pin/port connector, such power or IO pin/port connectors may similarly be easily removed and replaced without separating the base chassis top cover 211 from the base chassis bottom cover 210 and without replacing the motherboard for the mobile information handling system to make fixing and continued use of the mobile information handling system simpler.

A keyboard in an embodiment at block 608 may be operably connected to the motherboard. For example, in an embodiment described with reference to FIG. 1, the keyboard 120 and keyboard controller 121 in an embodiment may communicate with or be operably connected to the touchpad PCBA 142 or the processor 101 of the motherboard for the information handling system 100 via bus 108. In some embodiments, the touchpad PCBA 142 may also communicate with the keyboard 120 via a USB link 123.

At block 610, batteries may be inserted within the base chassis bottom cover and operably connected to the motherboard. For example, in an embodiment described with respect to FIG. 3, batteries 342 for the mobile information handling system may be accessed, removed, or inserted within the base chassis bottom cover 310 and operably connected to the motherboard and other components of the mobile information handling system. Batteries 342 may be removable and replaceable in the mobile information handling base chassis and accessible under a removable palm rest and touchpad assembly, as described herein. Thus, a part like the batteries 342 that is prone to failure may easily and efficiently be replaced in embodiments herein.

A removable palm rest and touchpad assembly may be operably connected to the motherboard in an embodiment at block 612, and the removable palm rest and touchpad assembly may be fastened to the base chassis. For example, in an embodiment described with respect to FIG. 2, a removable palm rest and touchpad assembly 240 may be operably connected to a motherboard via a data and power connector and including to a processor of the information handling system in an embodiment. The removable palm rest and touchpad assembly 240 may also be fastened to the base chassis bottom cover 210 via fasteners such as screws, magnets or other easy to use attachment devices. In another example embodiment described with reference to FIG. 1, the removable palm rest and touchpad assembly 140 that is housed within a removable palm rest and touchpad assembly (e.g., 240 of FIG. 2) that may be operably connected via bus 108 to a motherboard housing the processor 101 of the information handling system 100 in an embodiment.

In another example embodiment described with respect to FIG. 3, the removable palm rest and touchpad assembly 340 may be connected to the base chassis top cover 311 via a hinge that allows for upward lifting of the front edge of the removable palm rest and touchpad assembly 340 facing the user to expose the batteries 342 housed underneath within the base chassis bottom cover 310. The rotatable edge of the removable palm rest and touchpad assembly 340 in various embodiments herein may further be fastened to the base chassis bottom cover 310 via one or more magnets, screws 341 or other fasteners.

At block 614, a base chassis top cover may be joined to the base chassis bottom cover in an embodiment. For example, in an embodiment described with reference to FIG. 2, the base chassis top cover 211 may be joined to a base chassis bottom cover 210 in an embodiment, to form a mobile information handling system base chassis. In an embodiment, such a base chassis may also be operably connected (e.g., via a hinge) to a mobile information handling system display chassis housing a digital display.

A replaceable IO and power pin/port connector module with a release tab may be formed in an embodiment at block 616 to house a power pin/port connector and an IO pin/port connector. For example, in an embodiment described with respect to FIG. 5A, a replaceable IO and power pin/port connector module with a release tab 531 may be formed to house a power pin/port connector 532 and an IO pin/port connector 533. A method of forming such a replaceable IO and power pin/port connector module in an embodiment may be described in greater detail below with respect to FIG. 7.

At block 618, the replaceable IO and power pin/port connector module in an embodiment may be inserted into the top cover chassis opening for the replaceable IO and power pin/port connector module. For example, in an embodiment described with respect to FIG. 4A, the replaceable IO and power pin/port connector module 430 may be removed from or inserted into the top cover chassis opening 414 for the replaceable IO and power pin/port connector module 430.

A power cable connector may be inserted into the replaceable power pin/port connector via the power pin/port connector chassis sidewall aperture in an embodiment at block 620. For example, in an embodiment described with respect to FIG. 1, the replaceable power pin/port connector 133 of the replaceable power and IO pin/port connector module 130 in an embodiment may be operably connected to one or more power sources 193 via a power cord 194. Such a power cord 194 in an embodiment may provide D/C power to the information handling system 100 via the replaceable power pin/port connector 133. The replaceable power pin/port connector 133 may have a pin configuration or port housing that adheres to any known or later developed configuration for supplying DC power, including barrel housings, rectangular or square housings, and various thicknesses (e.g., 5.5 mm or 2.1 mm).

At block 622, an IO cable connector may be inserted into the replaceable IO pin/port connector via the IO pin/port connector chassis sidewall aperture in an embodiment. For example, one or more IO devices 191 in an embodiment may be operably connected to the IO pin/port connector 132 of the replaceable power and IO pin/port connector module 130 via a connector cable 192 adhering to any number of IO connector cable formats. The IO pin/port connector 132 and the cable 192 may adhere to any of the known or later-developed standards for the universal serial bus (USB), including USB 2.0, USB 3.X, USB-A, USB-B, USB-C, USB-mini, and USB-micro. In other example embodiments, the IO pin/port connector 132 and the cable 192 may adhere to other standards such as High Definition Multimedia Interface (HDMI®), Serial Advanced Technology Attachment (SATA), external-SATA (e-SATA), Firewire®, Thunderbolt®, DisplayPort®, Mini-DisplayPort®, audio, Video Graphics Array (VGA), Digital Visual Interface (DVI), Mini-DVI, DVI-I, DVI-D, digital audio, co-axial cable, Ethernet®, modem, personal system/2 (ps/2), or any known or later-developed IO interface standards. The method for forming a mobile information handling system chassis incorporating a replaceable IO and power pin/port connector module and a removable palm rest and touchpad assembly for ease of battery replacement in an embodiment may then end.

Figure 7:
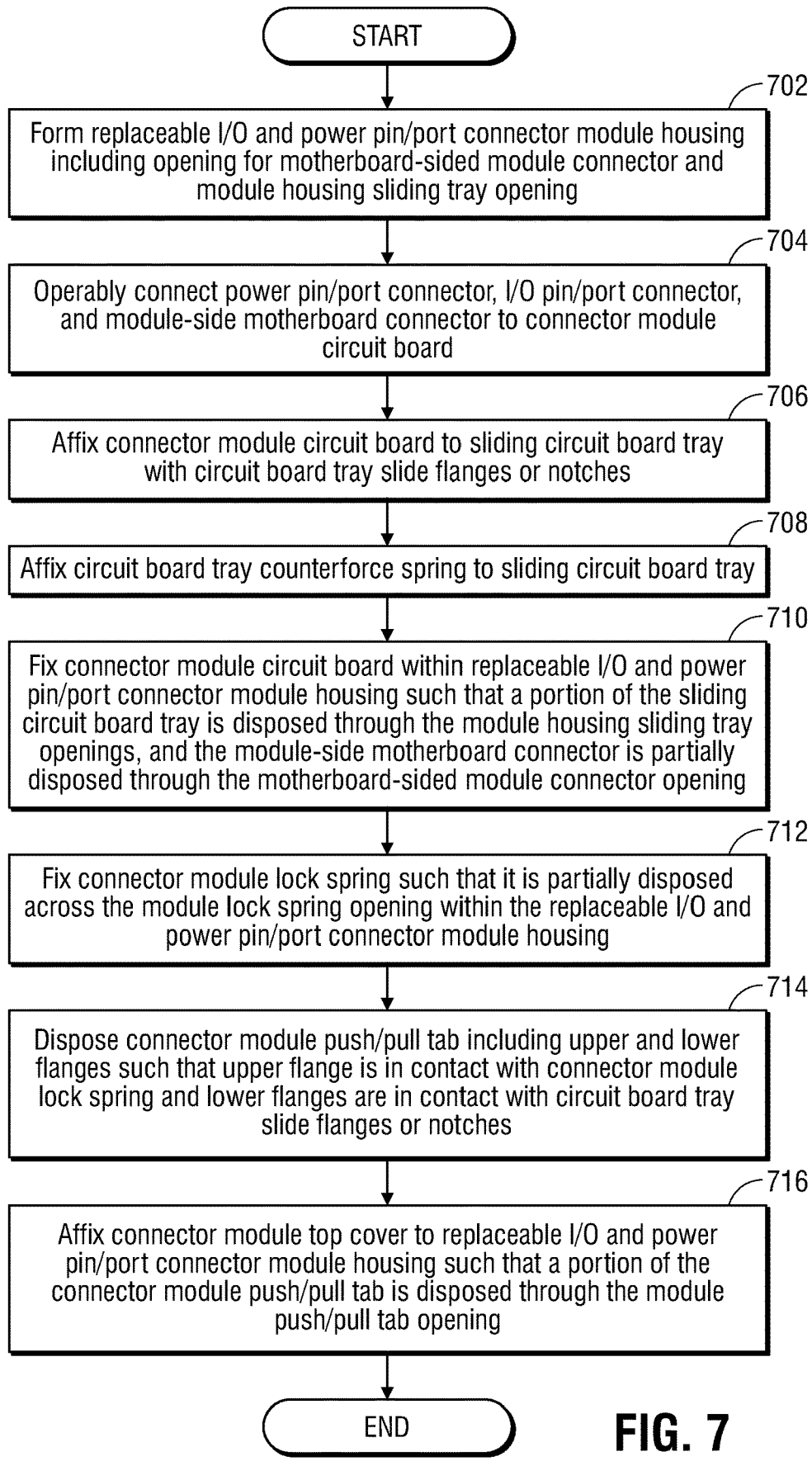
FIG. 7 is a flow diagram illustrating a method of manufacturing a replaceable IO and power pin/port connector module according to an embodiment of the present disclosure.

FIG. 7 is a flow diagram illustrating a method of manufacturing a replaceable IO and power pin/port connector module for removal from and replacement within a mobile information handling system base chassis without separating the base chassis top cover from the base chassis bottom cover according to an embodiment of the present disclosure. As described herein, the replaceable IO and power pin/port connector module in an embodiment may house one or more replaceable module power or IO pin/port connectors operably connected to a connector module circuit board and a module-side motherboard connector. Upon insertion of such a replaceable IO and power pin/port connector module, the module-side motherboard connector in an embodiment may mate with a motherboard-sided module connector operably connected to the motherboard (e.g., including the processor) of the information handling system. Thus, the replaceable IO and power pin/port connector module may mate with a motherboard of the information handling system and be decoupled from the motherboard of the information handling system (e.g., for replacement) without replacing the motherboard of the information handling system.

The design of the replaceable IO and power pin/port connector module in embodiments may also allow for removable, replacement, and insertion of the replaceable IO and power pin/port connector module within the base chassis of the information handling system without separating the base chassis bottom cover from the base chassis top cover making connector replacement simpler and extending mobile information handling system life. For example, the replaceable IO and power pin/port connector module may incorporate a sliding circuit board tray that allows for movement of the connector module circuit board and the operably connected replaceable module power and IO pin/port connectors. This may cause the replaceable module power and IO pin/port connectors to slide partially into sidewall apertures for these connectors within the base chassis bottom cover when the replaceable IO and power pin/port connector module is in a locked position. This may also allow for the replaceable module power and IO pin/port connectors to slide away from these openings and into the interior of the module to ease user removal of the module from the base chassis upon replacement. A series of springs and locks within the replaceable IO and power pin/port connector module in embodiments may further operate to lock the module into place within the base chassis in response to user application of downward force on an exterior push/pull tab and to unlock the module from the base chassis upon user upward force on the exterior push/pull tab.

At block 702, a replaceable IO and power pin/port connector module housing may be formed in an embodiment to include an opening for a motherboard-sided module connector and module housing sliding tray opening. For example, in an embodiment described with respect to FIG. 4B, a replaceable IO and power pin/port connector module housing 435 may be formed of plastic, aluminum, glass (for a top surface), acrylic, or another suitable material in an embodiment for housing a power pin/port connector 432 and an IO pin/port connector 433. In another example embodiment described with respect to FIG. 4C, a replaceable IO and power pin/port connector module housing 435 may be formed in an embodiment to include an opening 458 for a motherboard-sided module connector and one or more openings 459 for a module housing sliding tray 453 to provide for engagement, replacement and movement of an operatively coupled connector module circuit board and connectors 432 and 433. In another example embodiment described with reference to FIG. 4D, a replaceable IO and power pin/port connector module housing 435 may be formed in an embodiment to include an opening having a module-sided motherboard connector 454 for receiving a motherboard-sided module connector 461 on a motherboard. In still other example embodiments described with respect to FIGS. 5B and 5D, the replaceable IO and power pin/port connector module housing 535 may be formed in an embodiment to include a module housing sliding tray opening 559 as described.

A power pin/port connector, IO pin/port connector, and module-sided motherboard connector may be operably connected in an embodiment at block 704 to a connector module circuit board. For example, in embodiments described with respect to FIGS. 5A, 5B, and 5D, a power pin/port connector 532, IO pin/port connector 533, and module-sided motherboard connector may be operably connected in an embodiment to a connector module circuit board 551. In another example embodiment described with respect to FIG. 4D, a module-sided motherboard connector 454 may be operably connected in an embodiment to a connector module circuit board 451.

At block 706, the connector module circuit board in an embodiment may be affixed to a sliding circuit board tray having circuit board tray slide flanges. For example, in an embodiment described with reference to FIGS. 5A, 5B, and 5D, the connector module circuit board 551 in an embodiment may be affixed via a fastener, interfacing fit, adhesive, or other method to a sliding circuit board tray 553 having circuit board tray slide notches 556. This may allow the connector module circuit board 551, the replaceable power pin/port connector 532 and the replaceable IO pin/port connector 533 to move in the positive and negative X direction with respect to the replaceable IO and power pin/port connector module housing 535 and the base chassis bottom cover 510.

A circuit board tray counterforce spring in an embodiment at block 708 may be affixed to the sliding circuit board tray. For example, in an embodiment described with respect to FIG. 5A, a circuit board tray counterforce spring 552 in an embodiment may be affixed to the sliding circuit board tray 553 via a fastener, interfacing fit, adhesive, or other method for countering sliding movement of the sliding circuit board tray 553 in the positive X direction in the replaceable IO and power pin/port connector module housing 535 (e.g., toward the sidewall apertures of the base chassis). This may prohibit overextension of the replaceable module power and IO pin/port connectors 532 and 533, respectively, through sidewall apertures within the base chassis bottom cover.

At block 710, the connector module circuit board may be fixed in an embodiment within the replaceable IO and power pin/port connector module housing such that a portion of the sliding circuit board tray is disposed through the module housing sliding tray openings, and the module-sided motherboard connector is partially disposed through the motherboard-sided module connector opening. For example, in an embodiment described with respect to FIG. 4C, a connector module circuit board may be fixed in an embodiment within the replaceable IO and power pin/port connector module housing 435 such that a portion of the sliding circuit board tray 454 is disposed through the module housing sliding tray openings 459, and the module-sided motherboard connector 454 is partially disposed through the motherboard-sided module connector opening 458. In another example embodiment described with respect to FIG. 4D, a module-sided motherboard connector (e.g., 454 in FIG. 4C) may be partially disposed through a motherboard-sided module connector opening within the replaceable IO and power pin/port connector module housing 435, for mating with the motherboard-sided module connector 461 on a motherboard.

In another example embodiment described with reference to FIG. 5A, the connector module circuit board 551 may be fixed in an embodiment within the replaceable IO and power pin/port connector module housing 535 such that a portion of the sliding circuit board tray 553 is disposed through module housing sliding tray openings (e.g., 459 of FIG. 4C) and the module-sided motherboard connector (e.g., 454 of FIG. 4C) is partially disposed through the motherboard-sided module connector opening (e.g., 458 of FIG. 4C) in the bottom surface of the replaceable IO and power pin/port connector module housing 535. In still other example embodiments described with respect to FIGS. 5B and 5D, the connector module circuit board 551 may be fixed within the replaceable IO and power pin/port connector module housing 535 such that a portion of the sliding circuit board tray 553 is disposed through the module housing sliding tray openings 559.

A circuit connector module lock spring in an embodiment at block 712 may be fixed via interference fit or a fastener to the replaceable IO and power pin/port connector module housing such that it is partially disposed across the module lock spring opening to bow outward from the replaceable IO and power pin/port connector module housing. For example, in an embodiment described with reference to FIG. 4C, a circuit connector module lock spring 455 in an embodiment may be fixed to the replaceable IO and power pin/port connector module housing 435 such that it is partially disposed across a module lock spring opening 437 within the housing 435, allowing the module lock spring 455 to bow outward and into a base chassis lock spring opening in a sidewall of the opening in the base chassis sized for receiving the replaceable IO and power pin/port connector module 430 as downward force is applied to the connector module push/pull tab 431.

In another example embodiment described with reference to FIG. 5A, a circuit connector module lock spring 555 may be fixed to the replaceable IO and power pin/port connector module housing 535 such that it is partially disposed across a module lock spring opening (e.g., 437 in FIG. 4C). This may allow the module lock spring 555 to bow outward (in the negative X direction) and into a base chassis lock spring opening in a sidewall of the opening in the base chassis sized for receiving the replaceable IO and power pin/port connector module 430 as downward force is applied to the connector module push/pull tab 531. This may operate to lock the replaceable IO and power pin/port connector module housing 535 into place within the mobile information handling system base chassis.

At block 714, the connector module push/pull tab in an embodiment, including upper and lower flanges may be disposed such that the upper flange is in contact with the connector module lock spring and the lower flanges are in contact with the circuit board tray slide notches. For example, in an embodiment described with reference to FIGS. 5A, 5B, and 5D, the connector module push/pull tab 531 in an embodiment, including upper flange 538 and lower flanges 534 may be disposed such that the upper flange 538 is in contact with the connector module lock spring 555 to bow it outward and the lower flanges 534 are in contact with the circuit board tray slide notches 556 to slide the sliding circuit board tray 555.

A connector module top cover in an embodiment at block 716 may be affixed to the replaceable IO and power pin/port connector module housing such that a portion of the connector module push/pull tab is disposed through the module push/pull tab opening. For example, in an embodiment described with respect to FIGS. 4B and 4D, a connector module push/pull tab 431 may be at least partially disposed within the replaceable IO and power pin/port connector module housing 435, and movably inserted through a module push/pull tab opening 436 within a connector module top cover 439 that may be affixed to the replaceable IO and power pin/port connector module housing 435. In another example embodiment described with reference to FIGS. 5B and 5D, a connector module top cover 539 in an embodiment may be affixed via a weld, adhesive, interference fit, or fasteners to the replaceable IO and power pin/port connector module housing 535 such that a portion of the connector module push/pull tab 531 is disposed through the module push/pull tab opening (e.g., 436 of FIG. 4D). The connector module top cover may be made of any suitable material including glass, aluminum, plastic or other material in various embodiments herein. The method for manufacturing a replaceable IO and power pin/port connector module for removal from and replacement within a mobile information handling system base chassis without separating the base chassis top cover from the base chassis bottom cover in an embodiment may then end.

Figure 8:
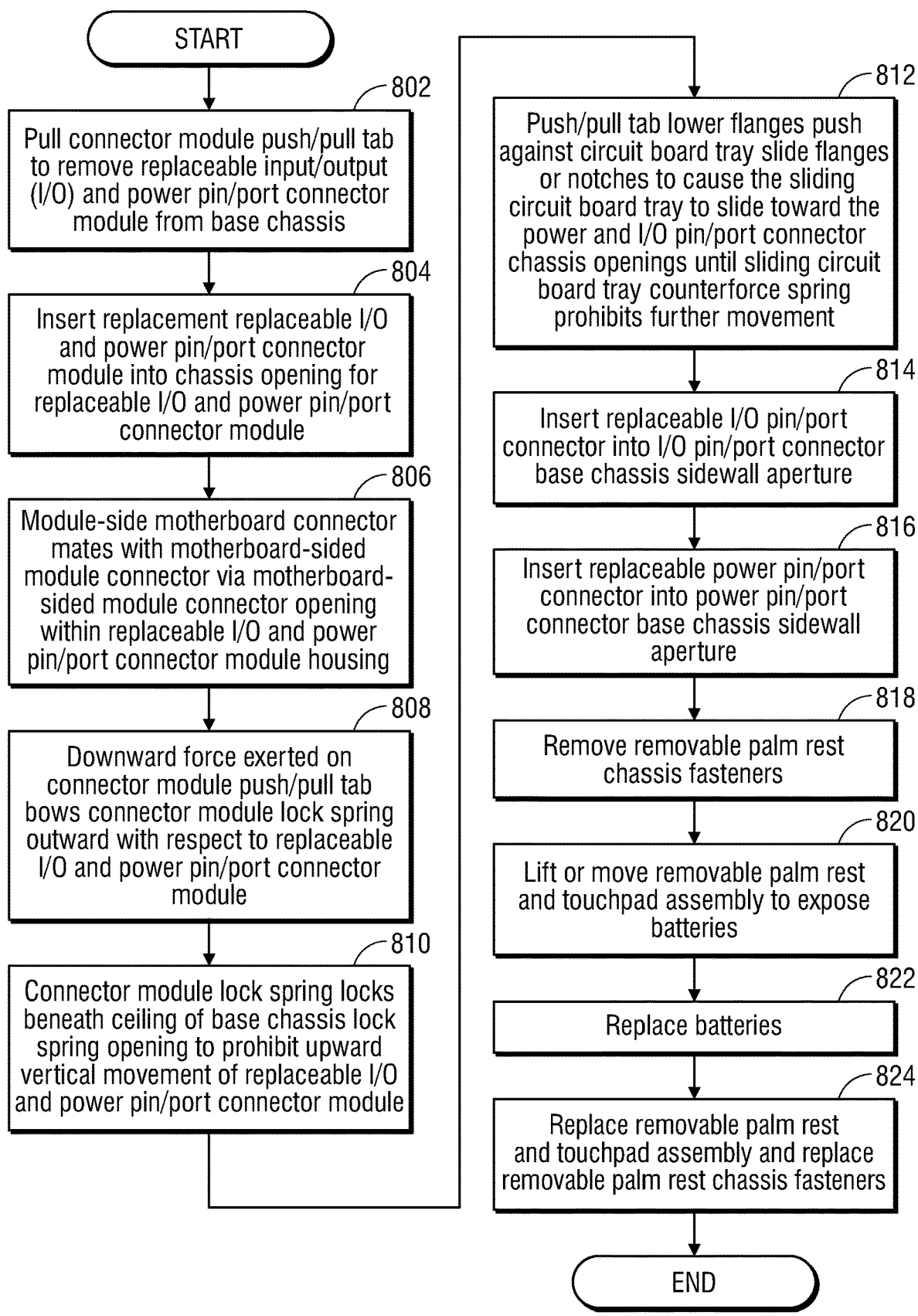
FIG. 8 is a flow diagram illustrating a method for replacing a replaceable IO and power pin/port connector module and for replacing batteries within a mobile information handling system base chassis according to an embodiment of the present disclosure.

FIG. 8 is a flow diagram illustrating a method of replacing a replaceable IO and power pin/port connector module and batteries within a mobile information handling system base chassis without separating the base chassis top cover from the base chassis bottom cover according to an embodiment of the present disclosure. As described in embodiments herein, the replaceable IO and power pin/port connector module and the removable palm rest and touchpad assembly allow the user to remove and replace the replaceable IO and power pin/port connector module to replace broken connectors and to easily move the removable palm rest and touchpad assembly to access and replace batteries, without separating the base chassis top cover from the base chassis bottom cover.

At block 802, a connector module push/pull tab may be pulled to remove a replaceable input/output (IO) and power pin/port connector module from a mobile information handling system base chassis in an embodiment. For example, in an embodiment described with respect to FIG. 4A, the connector module push/pull tab 431 located on the top surface of the replaceable IO and power pin/port connector module 430 may be pulled by a user to remove the replaceable IO and power pin/port connector module 430 from the mobile information handling system top cover chassis opening 414. This may lift upper flange and relax the connector module lock spring so it is not bowed into the base chassis lock spring opening. The circuit board slide tray and the IO and power connector may slide inward due to the circuit board tray counterforce spring. The user may then lift the replaceable IO and power pin/port connector module 430 and disconnect it from the motherboard.

A replacement replaceable IO and power pin/port connector module may be inserted into the mobile information handling system top cover chassis opening for receiving the replaceable IO and power pin/port connector module in an embodiment at block 804. For example, in an embodiment described with respect to FIG. 4B, the replaceable IO and power pin/port connector module 430 in an embodiment may be removed and replaced by a replacement replaceable IO and power pin/port connector module through insertion into the mobile information handling system top cover chassis opening 414 for the replaceable IO and power pin/port connector module 430 to replace broken connectors in an embodiment, without separating the base chassis top cover 411 from the base chassis bottom cover 410 or replacing the motherboard of the mobile information handling system.

At block 806, a module-sided motherboard connector may mate with a motherboard-sided module connector via motherboard-sided module connector opening within the replaceable IO and power pin/port connector module housing in an embodiment. For example, in an embodiment described with respect to FIG. 4C, the module-sided motherboard connector 454 may mate with a motherboard-sided module connector of the mobile information handling system via motherboard-sided module connector opening 458 within the replaceable IO and power pin/port connector module housing 435 in an embodiment. In another example embodiment described with reference to FIG. 4D, the replaceable IO and power pin/port connector module housing 435 may at least partially house power and IO pin/port connectors, and a connector module circuit board operably connected to a module-sided motherboard connector for mating with the motherboard-sided module connector 461. In still another example embodiment described with respect to FIG. 4E, a module-sided motherboard connector 454 may mate with a motherboard-sided module connector 461 via motherboard-sided module connector opening 458 within the replaceable IO and power pin/port connector module housing 435, which may be joined to the connector module top cover 439 to form the replaceable IO and power pin/port connector module in an embodiment. Such a mating of the module-sided motherboard connector 454 with the motherboard-sided module connector 461 may operably connect a connector module circuit board 451 and power and IO pin/port connectors housed within the replaceable IO and power pin/port connector module housing 435 to the motherboard 460 of the mobile information handling system.

A user may apply downward force on the connector module push/pull tab to bow a connector module lock spring outward with respect to the replaceable IO and power pin/port connector module in an embodiment at block 808. For example, in an embodiment described with reference to FIG. 4C, a circuit connector module lock spring 455 in an embodiment may be fixed to the replaceable IO and power pin/port connector module housing 435 such that it is partially disposed across a module lock spring opening within the housing 435, allowing the module lock spring 455 to bow outward and into a base chassis lock spring opening in a sidewall of the opening in the base chassis sized to receive the replaceable IO and power pin/port connector module as downward force is applied to the connector module push/pull tab 431. In another example embodiment described with respect to FIGS. 5A, 5C, and 5D, a user may apply downward force on the connector module push/pull tab 531 to cause the upper flange 538 to bow the connector module lock spring 555 outward in the negative X direction and into the base chassis lock spring opening 557.

At block 810, the connector module lock spring may lock beneath a ceiling of a base chassis lock spring opening formed in a sidewall of the opening in the base chassis sized for receiving the replaceable IO and power pin/port connector module to prohibit upward vertical movement of the replaceable IO and power pin/port connector module in an embodiment. For example, in an embodiment described with reference to FIG. 4C, disposition of the circuit connector module lock spring 455 across the module lock spring opening within the housing 435 may allow the module lock spring 455 to bow outward and beneath the ceiling of a base chassis lock spring opening as downward force is applied to the connector module push/pull tab 431. This may operate to lock the replaceable IO and power pin/port connector module 430 into place within the opening of the mobile information handling system base chassis for receiving the replaceable IO and power pin/port connector module 430.

More specifically, in another example embodiment described with respect to FIG. 5A, this bowed portion of the connector module lock spring 555 may lock beneath a ceiling of a base chassis lock spring opening 557 to prohibit upward vertical movement with respect to opening in the base chassis 510 of the information handling system for receiving the replaceable IO and power pin/port connector module housing 535 in an embodiment. For example, in an embodiment described with respect to FIG. 5D, a portion of the connector module lock spring 555 that bows outward in such a way may lock beneath a ceiling of a base chassis lock spring opening 557 to prohibit upward vertical lifting movement (in the positive Z direction) out of the opening in the base chassis bottom cover 510 for receiving the replaceable IO and power pin/port connector module housing 535 in an embodiment. This may place the replaceable IO and power pin/port connector module 530 in a locked position with respect to the mobile information handling system base chassis in an embodiment.

Push/pull tab lower flanges in an embodiment at block 812 may push against circuit board tray slide notches to cause the sliding circuit board tray to slide toward the power and IO pin/port connector chassis sidewall apertures until a sliding circuit board tray counterforce spring prohibits further movement. For example, in embodiments described with respect to FIGS. 5A, 5B, and 5D, the push/pull tab lower flanges 534 may push against the circuit board tray slide notches 556 to cause the sliding circuit board tray 553 to slide toward the power and IO pin/port connector chassis sidewall apertures (e.g., 512 or 513) within the base chassis bottom cover 510 until the sliding circuit board tray counterforce spring 552 prohibits further movement in the positive X direction toward the sidewall apertures 512 and 513. Sliding of the sliding circuit board tray 553 within the replaceable IO and power pin/port connector module may be guided by one or more module housing sliding tray openings 559.

At block 814, movement of the sliding circuit board tray may insert a replaceable IO pin/port connector in an embodiment into an IO pin/port connector base chassis sidewall aperture. For example, in embodiments described with respect to FIGS. 5D and 5E, a replaceable IO pin/port connector 533 in an embodiment is inserted into an IO pin/port connector base chassis sidewall aperture 513 when sliding circuit board tray 553 is moved toward the base chassis sidewall apertures upon pushing down the push/pull tab 531. This may occur because the replaceable IO pin/port connector 533 is fixed to the sliding circuit board tray 553, and thus, may move in the positive or negative X direction along with the sliding circuit board tray 553 when urged by the lower flange 534.

A replaceable power pin/port connector in an embodiment at block 816 may also be inserted into a power pin/port connector base chassis sidewall aperture by movement of the sliding circuit board tray. For example, in embodiments described with respect to FIGS. 5D and 5E, the replaceable power pin/port connector 532 may also be fixed to the sliding circuit board tray 553, and may similarly move in the positive or negative X direction along with the sliding circuit board tray 553 when sliding circuit board tray 553 is moved forward the base chassis sidewall apertures upon pushing down the push/pull tab 531. Thus, in another aspect of an embodiment, the replaceable power pin/port connector 532 may insert into a power pin/port connector base chassis sidewall aperture 512 with downward force applied to the connector module push/pull tab 531 causing the lower flanges 534 to urge the sliding circuit board tray 553 toward the sidewall aperture 512.

At block 818, removable palm rest chassis fasteners may be removed from the base chassis in an embodiment. For example, in an embodiment described with respect to FIG. 3, the removable palm rest chassis fasteners 341 in an embodiment may be removed from the base chassis bottom cover 310.

A removable palm rest and touchpad assembly in an embodiment at block 820 may be lifted, overcoming magnetic attraction of any holding magnets around the removable palm rest and touchpad assembly to expose information handling system batteries. For example, in an embodiment described with respect to FIG. 3, upon removal of the removable palm rest chassis fasteners 341 from the base chassis bottom cover 310, and lifting or removal of the removable palm rest and touchpad assembly 340, the batteries 342 housed within the base chassis bottom cover 310 may be exposed without separating the base chassis bottom cover 310 from the base chassis top cover 311. In another example embodiment described with reference to FIG. 1, the removable palm rest and touchpad assembly 140 may be removed from the base chassis bottom cover in which various components of the information handling system 100 are housed in order to access, remove, or replace the batteries 105 housed within the base chassis bottom cover and operably connected to the processor 101 of the motherboard of the mobile information handling system 100 via bus 108, without separating the base chassis bottom cover from the base chassis top cover.

At block 822, batteries for the mobile information handling system may be disconnected and replaced with new batteries without separating the base chassis top cover from the base chassis bottom cover in an embodiment. For example, in an embodiment described with respect to FIG. 3, upon removal of the removable palm rest chassis fasteners 341 from the base chassis bottom cover 310, and lifting or removal of the removable palm rest and touchpad assembly 340, overcoming any magnetic attraction of magnets holding it in place, the batteries 342 housed within the base chassis bottom cover 310 may be more easily accessed and replaced without separating the base chassis bottom cover 310 from the base chassis top cover 311.

The removable palm rest and touchpad assembly may be replaced in an embodiment at block 824, and the removable palm rest chassis fasteners may be reinserted into the base chassis. For example, the removable palm rest and touchpad assembly 340 may be replaced or lifted back into a downward or closed position and engaging holding magnets in an embodiment, and the removable palm rest chassis fasteners 341 may be reinserted into the base chassis bottom cover 310. The method for replacing a replaceable IO and power pin/port connector module and batteries within a mobile information handling system base chassis without separating the base chassis top cover from the base chassis bottom cover in an embodiment may then end.

The blocks of the flow diagram of FIGS. 6, 7, and 8 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A base chassis assembly for an information handling system for user replacement of a replaceable power pin/port connector and a replaceable input/output (IO) pin/port connector comprising:

a base chassis bottom cover having a power pin/port connector chassis sidewall aperture and an IO pin/port connector chassis sidewall aperture with a base chassis top cover joined to the base chassis bottom cover to form the base chassis assembly;

a replaceable IO and power pin/port connector module disposed opening within the base chassis assembly for receiving the replaceable IO and power pin/port connector module, where the replaceable IO and power pin/port connector module houses a connector module circuit board operably connected to the replaceable power pin/port connector and the replaceable IO pin/port connector;

the connector module circuit board operably coupled to a sliding circuit board tray movably housed within the replaceable IO and power pin/port connector module to slide the replaceable power pin/port connector into the power pin/port connector chassis sidewall aperture and to slide the replaceable IO pin/port connector into the IO pin/port connector chassis sidewall aperture; and the replaceable IO and power pin/port connector module operably connected to a motherboard of the information handling system via a module-sided motherboard connector disposed on a side of a replaceable IO and power pin/port connector module housing.

2. The base chassis assembly of claim 1, wherein the replaceable IO pin/port connector adheres to the Universal Serial Bus (USB) C (USB-C) standard.

3. The base chassis assembly of claim 1, wherein the replaceable IO and power pin/port connector module operably connects to the motherboard of the information handling system via the module-sided motherboard connector mating with a motherboard-sided module connector housed disposed within the opening within the base chassis assembly for receiving the replaceable IO and power pin/port connector module.

4. The base chassis assembly of claim 1 further comprising:

the replaceable IO and power pin/port connector module having a flange on a connector module push/pull tab engaging with the sliding circuit board tray via a downward force exerted on the connector module push/pull tab to slide the sliding circuit board tray toward the IO pin/port connector chassis sidewall aperture and the power pin/port connector chassis sidewall aperture.

5. The base chassis assembly of claim 1 further comprising:

the replaceable IO and power pin/port connector module having a flange on a connector module push/pull tab engaging with the sliding circuit board tray and receiving an upward force at the connector module push/pull tab exerted from a circuit board tray counterforce spring to push the sliding circuit board tray away from the IO pin/port connector chassis sidewall aperture and the power pin/port connector chassis sidewall aperture.

6. The base chassis assembly of claim 1 further comprising:

the replaceable IO and power pin/port connector module including a connector module lock spring on the replaceable IO and power pin/port connector module housing and, upon downward pressure placed on a connector module push/pull tab, causing a flange to engage and bow outward the connector module lock spring to lock the replaceable IO and power pin/port connector module into a base chassis lock spring opening within the base chassis assembly.

7. The base chassis assembly of claim 1 further comprising:

a removable palm rest and touchpad assembly operatively coupled to the base chassis bottom cover via one or more fasteners to enclose one or more batteries operably connected to the information handling system; and the removable palm rest and touchpad assembly lifted from a portion of the base chassis top cover upon removal of the one or more fasteners for access and replacement of the one or more batteries disposed underneath the removable palm rest and touchpad assembly.

8. A method of assembling a base chassis assembly for an information handling system for user replacement of a replaceable power pin/port connector and a replaceable input/output (IO) connector comprising:

forming a base chassis bottom cover having a power pin/port connector chassis sidewall aperture and an IO pin/port connector chassis sidewall aperture and joining a base chassis top cover to the base chassis bottom cover to form the base chassis assembly;

operatively coupling a connector module circuit board to the replaceable power pin/port connector and the replaceable IO pin/port connector;

operatively coupling the connector module circuit board to a sliding circuit board tray movably housed within the replaceable IO and power pin/port connector module;

installing the replaceable IO and power pin/port connector module within an opening in the base chassis assembly sized to receive the replaceable IO and power pin/port connector module within the base chassis assembly;

sliding the replaceable power pin/port connector into the power pin/port connector chassis sidewall aperture and sliding of the replaceable IO pin/port connector into the IO pin/port connector chassis sidewall aperture via actuation of a connector module push/pull tab; and operatively coupling the replaceable IO and power pin/port connector module to a motherboard of the information handling system via a module-sided motherboard connector disposed on a bottom side of a replaceable IO and power pin/port connector module housing.

9. The method of claim 8 further comprising:

forming a flange on the connector module push/pull tab in the replaceable IO and power pin/port connector module to contact a notch in the sliding circuit board tray to slide the connector module circuit board with the replaceable power pin/port connector and the replaceable IO pin/port connector toward the power pin/port connector chassis sidewall aperture and the IO pin/port connector chassis sidewall aperture upon a downward force applied to the connector module push/pull tab.

10. The method of claim 8 further comprising:

forming a flange on the connector module push/pull tab in the replaceable IO and power pin/port connector module to contact a notch in the sliding circuit board tray to slide the connector module circuit board with the replaceable power pin/port connector and the replaceable IO pin/port connector away from the power pin/port connector chassis sidewall aperture and the IO pin/port connector chassis sidewall aperture upon an upward force applied to the connector module push/pull tab.

11. The method of claim 8 further comprising:

operatively coupling a circuit board tray counterforce spring to the sliding circuit board tray to push the sliding circuit board tray away from the IO pin/port connector chassis sidewall aperture and the power pin/port connector chassis sidewall aperture when the connector module push/pull tab of the replaceable IO and power pin/port connector module is pulled up.

12. The method of claim 8 further comprising:

mating the module-sided motherboard connector disposed on the bottom side of the replaceable IO and power pin/port connector module housing with a motherboard-sided module connector disposed within the opening for receiving the replaceable IO and power pin/port connector module in the base chassis assembly.

13. The method of claim 8 further comprising:

forming a flange on the connector module push/pull tab in the replaceable IO and power pin/port connector module to contact a connector module lock spring on the replaceable IO and power pin/port connector module housing and, upon downward pressure placed on the connector module push/pull tab, causing a flange to engage and bow outward the connector module lock spring to lock the replaceable IO and power pin/port connector module into a base chassis lock spring opening within the base chassis assembly.

14. The method of claim 8 further comprising:

operatively coupling a removable palm rest and touchpad assembly to the base chassis assembly via one or more fasteners to enclose a battery operably connected to the information handling system under the removable palm rest and touchpad assembly for access to the battery upon removal of the one or more fasteners and lifting the removable palm rest and touchpad to overcome magnetic holders on the removable palm rest and touchpad assembly to service or replace the battery.

15. A base chassis assembly for an information handling system for user replacement of a replaceable power pin/port connector and a replaceable input/output (IO) pin/port connector comprising:

a base chassis bottom cover having a power pin/port connector chassis sidewall aperture and an IO pin/port connector chassis sidewall aperture with a base chassis top cover joined to the base chassis bottom cover to form the base chassis assembly;

a replaceable IO and power pin/port connector module disposed opening within the base chassis assembly for receiving the replaceable IO and power pin/port connector module, where the replaceable IO and power pin/port connector module houses a connector module circuit board operably connected to the replaceable power pin/port connector and the replaceable IO pin/port connector;

the connector module circuit board operably coupled to a sliding circuit board tray movably housed within the replaceable IO and power pin/port connector module to slide the replaceable power pin/port connector into the power pin/port connector chassis sidewall aperture and to slide the replaceable IO pin/port connector into the IO pin/port connector chassis sidewall aperture;

the replaceable IO and power pin/port connector module operably connected to a motherboard of the information handling system via a module-sided motherboard connector disposed on a side of a replaceable IO and power pin/port connector module housing; and a removable palm rest and touchpad assembly operatively coupled to the base chassis bottom cover via one or more fasteners to enclose a battery operably connected to the information handling system.

16. The base chassis assembly of claim 15, wherein the replaceable IO and power pin/port connector module operatively couples to the motherboard of the information handling system via the module-sided motherboard connector mating with a motherboard-sided module connector housed disposed within the opening within the base chassis assembly for receiving the replaceable IO and power pin/port connector module.

17. The base chassis assembly of claim 15 further comprising:

the replaceable IO and power pin/port connector module having a flange on a connector module push/pull tab engaging with the sliding circuit board tray via a downward force exerted on the connector module push/pull tab to slide the sliding circuit board tray toward the IO pin/port connector chassis sidewall aperture and the power pin/port connector chassis sidewall aperture.

18. The base chassis assembly of claim 15 further comprising:

the replaceable IO and power pin/port connector module having a flange on a connector module push/pull tab engaging with the sliding circuit board tray and receiving an upward force at the connector module push/pull tab exerted from a circuit board tray counterforce spring to push the sliding circuit board tray away from the IO pin/port connector chassis sidewall aperture and the power pin/port connector chassis sidewall aperture during removal of the replaceable IO and power pin/port connector module.

19. The base chassis assembly of claim 15 further comprising:

the replaceable IO and power pin/port connector module including a connector module lock spring on the replaceable IO and power pin/port connector module housing to lock the replaceable IO and power pin/port connector module into a base chassis lock spring opening within the base chassis assembly when bowed outward during installation of the replaceable IO and power pin/port connector module.

20. The base chassis assembly of claim 15 further comprising:

the removable palm rest and touchpad assembly lifted from a portion of the base chassis top cover upon removal of the one or more fasteners and overcoming magnet holders of the removable palm rest and touchpad assembly to access the battery disposed underneath the removable palm rest and touchpad assembly.

* * * * *